(12) United States Patent
Hall et al.

(10) Patent No.: US 10,195,580 B2
(45) Date of Patent: Feb. 5, 2019

(54) METHOD OF SELECTIVELY MASKING ONE OR MORE SITES ON A SURFACE AND A METHOD OF SYNTHESISING AN ARRAY OF MOLECULES

(71) Applicant: Evonetix Limited, Cambridge (GB)

(72) Inventors: Daniel Arthur Hall, Cambridge (GB); Christopher John Favero Jordan, Cambridge (GB)

(73) Assignee: EVONETIX LTD., Cambridge (GB)

( * ) Notice: Subject to any disclaimer, the term of this patent is extended or adjusted under 35 U.S.C. 154(b) by 443 days.

(21) Appl. No.: 14/912,365

(22) PCT Filed: Aug. 15, 2014

(86) PCT No.: PCT/EP2014/067517
§ 371 (c)(1),
(2) Date: Feb. 16, 2016

(87) PCT Pub. No.: WO2015/022432
PCT Pub. Date: Feb. 19, 2015

(65) Prior Publication Data
US 2016/0184788 A1 Jun. 30, 2016

(30) Foreign Application Priority Data

Aug. 16, 2013 (GB) .................. 1314721.0

(51) Int. Cl.
*B01J 19/00* (2006.01)
*C40B 50/18* (2006.01)
*C40B 60/14* (2006.01)

(52) U.S. Cl.
CPC .. *B01J 19/0046* (2013.01); *B01J 2219/00427* (2013.01); *B01J 2219/00441* (2013.01); *B01J 2219/00495* (2013.01); *B01J 2219/00653* (2013.01); *B01J 2219/00716* (2013.01); *B01J 2219/00722* (2013.01); *C40B 50/18* (2013.01); *C40B 60/14* (2013.01)

(58) Field of Classification Search
None
See application file for complete search history.

(56) References Cited

U.S. PATENT DOCUMENTS

| 5,143,854 A | * | 9/1992 | Pirrung | G01N 21/6428 |
| | | | | 435/7.92 |
| 6,255,677 B1 | | 7/2001 | Caillat et al. | |
| 2004/0224321 A1 | | 11/2004 | Nicolau et al. | |
| 2014/0197153 A1 | * | 7/2014 | Aguilar | B23K 1/012 |
| | | | | 219/482 |

FOREIGN PATENT DOCUMENTS

| EP | 1609851 A1 | 12/2005 |
| WO | WO-99/61148 A2 | 12/1999 |
| WO | WO-00/23182 A2 | 4/2000 |
| WO | WO-03/008088 A2 | 1/2003 |
| WO | WO-2005/114329 A2 | 12/2005 |
| WO | WO-2009/012026 A2 | 1/2009 |

OTHER PUBLICATIONS

International Search Report Issued in PCT/EP2014/067517 dated Mar. 5, 2015.

* cited by examiner

*Primary Examiner* — Christopher M Gross
(74) *Attorney, Agent, or Firm* — Mintz Levin Cohn Ferris Glovsky and Popeo, P.C.

(57) ABSTRACT

A method of creating a mask on a surface of a substrate is disclosed. The substrate comprises a plurality of spaced heating elements on or proximal to the surface. The method comprises applying a layer of masking material to the surface and employing the heating elements to apply energy to a phase change in the masking material at the selected sites such that it adheres to the surface or can be displaced from the surface to mask or unmask the selected sites respectively. A method of synthesising an array of molecules, an apparatus for selectively masking one or more sites on a surface and a semi-conductor chip that uses micro-heaters to modulate a masking layer on areas of the chip surface.

14 Claims, 10 Drawing Sheets

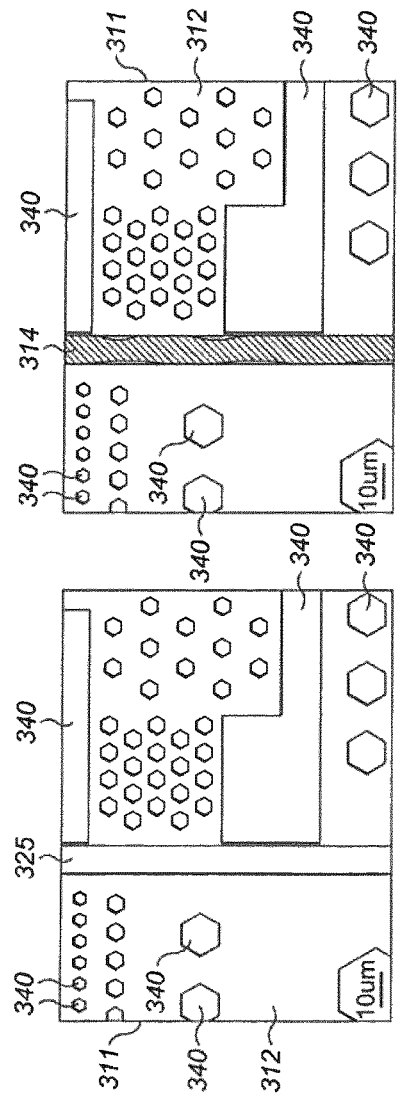
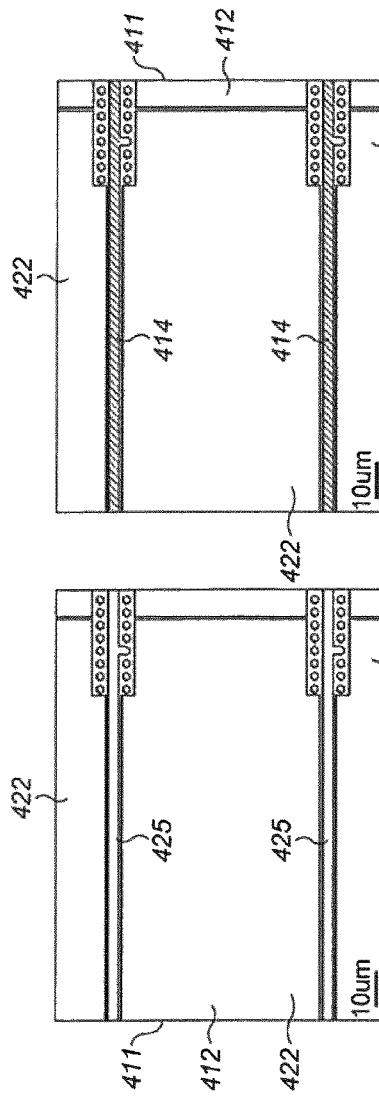

METHOD OF SELECTIVELY MASKING ONE OR MORE SITES ON A SURFACE AND A METHOD OF SYNTHESISING AN ARRAY OF MOLECULES

CROSS-REFERENCE TO RELATED APPLICATIONS

This application claims priority to and is U.S. national phase application of International Patent Application No. PCT/EP2014/067517 to Hall et al., filed Aug. 15, 2014, which claims priority to United Kingdom Patent Application No. 1314721.0, filed Aug. 16, 2013, the disclosures of which are incorporated herein by reference in their entireties.

The present invention relates to a method of selectively masking one or more sites on a surface and to a method of synthesising an array of molecules using the selective masking method of the invention. The methods of the invention may be used for the fabrication of oligonucleotide, peptide, oligosaccharide, Click chemistry or other polymer microarrays by incremental molecular assembly. The present invention also includes apparatus for use in the methods of the invention and a molecular microarray fabricated in accordance with the invention.

An oligonucleotide microarray typically comprises hundreds of thousands, or even millions, of oligonucleotide probes arrayed on a solid support, such as a glass slide or silicon chip. Oligonucleotide microarrays may be fabricated by "spotting" pre-prepared probes onto a surface, for example by using fine pins or needles controlled by a robotic arm. Alternatively oligonucleotide microarrays may be fabricated by synthesising the probes directly on the surface. Each probe may comprise about 5-200 nucleotides; typically about 25 nucleotides.

WO 95/00530 A1 discloses a method for making oligonucleotide arrays by synthesising oligonucleotide probes in situ on a substrate using photolithography. The oligonucleotides are immobilised on the substrate and synthesised base-wise in the 3' to 5' direction using light-sensitive protecting groups on the 5' terminal hydroxyl groups. During each synthesis cycle, the protecting groups are selectively removed by illuminating the surface through a photolithographic mask; the de-protected hydroxyl groups are coupled to a selected 5'-photo-protected deoxynucleoside phosphoramidite, while the growing strands in the un-illuminated regions of the surface remain protected and cannot react. Rounds of illumination and coupling are repeated with different activated deoxynucleosides as required until the desired set of oligonucleotide probes is obtained.

WO 90/15070 A1 discloses a method of synthesising polymers such as oligopeptides using photolithography in a manner similar to that described above for oligonucleotide microarrays, using photosensitive protecting groups such as nitroveratryloxy carbonyl (NVOC), nitrobenzyloxy carbonyl (NBOC), dimethyl dimethoxybenzyloxy carbonyl, 5-bromo-7-nitroindolinyl, o-hydroxy-a-methyl cinnamoyl and 2-oxymethylene anthraquinone to protect the N-terminal ends of the growing oligopeptides strands.

By using photolithography it is possible to fabricate oligonucleotide microarrays with a probe density of about $4 \times 10^6$ sequences/cm$^2$, in which the spacing between individual probes is of the order of 5 microns. It would be desirable to produce a microarray with an even greater density of surface-immobilised probes. For instance, a DNA or RNA microarray comprising more than $1 \times 10^7$ oligonucleotide probes would enable a single chip to cover all the common inherited single nucleotide polymorphism (SNP) variants for the human population. For the purpose of copy number repeat sensitivity analysis, it would be useful to have multiple copies of each probe available on an array so that the relative abundance of genomic features in a sample might be determined.

However, using existing variable data fabrication techniques, the manufacture of such a microarray, comprising billions of probes, would be time-consuming—of the order of several hours per synthetic cycle. It would also be important therefore significantly to reduce fabrication times, especially the rapidity with which data may be written to the microarray to control the selective de-protection of the growing strands.

An object of the present invention therefore is to provide a method of synthesising molecules in parallel on a silicon chip or other suitable substrate, allowing for an efficient union between information processing and chemistry.

Another object of the present invention is to provide a molecular microarray in which the spacing between individual probes is of the order of 0.5 microns. This would allow the provision of a chip carrying a library consisting of a billion individual molecules.

In accordance with a first aspect of the present invention therefore there is provided a method of creating a mask on a surface of a substrate, which substrate comprises a plurality of spaced heating elements on or proximal to the surface, the method comprising applying a layer of masking material to the surface and employing the heating elements to apply energy to the masking material at selected sites, whereby the applied energy brings about a phase change in the masking material at the selected sites such that it adheres to the surface or can be displaced from the surface to mask or unmask the selected sites respectively.

In some embodiments, the masking material may be applied to the surface in a first removable phase and the applied energy brings about a phase change in the masking material at the selected sites such that it adheres to the surface for masking the selected sites.

In accordance with a second aspect of the present invention therefore there is provided a method of selectively masking one or more sites on a surface, said method comprising the steps of:

(a) providing a surface defining an array of sites, wherein each site comprises a heating element;

(b) depositing a layer of masking material in a first removable phase on the surface to cover a plurality of the sites;

(c) applying thermal energy to the masking material at one or more selected ones, but not all, of the plurality of sites to cause or allow the masking material to undergo a first localised phase change to a second phase at said selected sites; and (d) removing the remainder of the masking material in the first phase from the surface.

In some embodiments, the second phase of the masking material may wet the surface at the selected ones of the sites and form a non-porous, or substantially non-porous, masking layer over those sites. In such case, no further phase change of the masking material is required for the purpose of masking the selected ones of the sites.

However, in some embodiments, the first phase change may serve only to convert the masking material at the selected ones of the sites into a surface wetting phase, which adheres to the surface, allowing the masking material that remains in the first removable phase to be removed from the surface without dislodging the masking material in the second phase at the selected ones of the sites, but which remains porous. In such embodiments, the masking material in the second phase may be partially melted and coalesced, but, as described in more detail below, the method of the invention may further comprise treating the masking material at the sites to undergo a second further phase change to a third phase. Said third phase may be well adhered to the surface and substantially non-porous, serving to mask the selected ones of the sites while leaving the sites not selected in step (c) unmasked. Suitably the masking material in the third phase may have a high packing density.

In some embodiments, the sites may be functionalised. By "functionalised" herein, is meant that each site of the array on the surface possesses a specific functional property, which is absent from the other areas of the surface between the sites. The functional property may be physical or chemical and permits the site to interact in a specific manner with an extrinsic agent, substance or material. For instance said functional property may consist in binding to, or bonding or reacting with, an extrinsic agent, substance or material that is applied to the surface. Such binding may be specific or non-specific. In some embodiments the functional property may consist in reacting physically or chemically with one or more extrinsic reagents or materials.

In some embodiments, each site may be functionalised with a surface attachment agent that is capable of attaching to the surface and has one or more free functional groups capable of binding or bonding with a molecular precursor, molecular chain extender or other moiety, such for example as a linker or other molecular precursor or chain extender of the kind described below. For instance, in some embodiments as described below, the surface may comprise a layer of gold or another metal at each site. The attachment agent may comprise a thiol of the kind known in the art for attachment to gold, such as an alkythiol with a terminal functional group such as an amino, thiol, hydroxyl or carboxylic group. Suitably a $C_{2-6}$aminoalkyl thiol such as aminopropyl thiol may be used.

In some embodiments as described below, the surface may comprise a layer of silica at each site. The attachment agent may suitably comprise a silane of the kind known in the art for attaching proteins and other biomaterials to glass and other silica surfaces, such as an alkylsilane with a terminal functional group such as an amino group. Suitably an amino functionalised ($C_{2-6}$alky)alkyloxysilane may be used, e.g. 3-aminopropyltriethoxysilane, but numerous other organo-functional groups are known to those skilled in art depending on the application, including especially halo, aldo (aldehyde) and hydroxyl groups, but also diamino, vinyl/olefin, epoxy, sulfur, nitrobenzamide, pyridyl-thio, cyano and alkyl groups.

In yet another embodiment, the surface may comprise a layer of carbon (e.g. diamond) at each site. The attachment agent may comprise suitable carbon to carboxyl chemistry of the kind known to those skilled in the art.

In yet another embodiment, each site may be functionalised by a low melting point polymer layer, e.g. for capturing carrier particles, such as beads of the kind described below, and for retaining them at each site. The polymer layer may have a melting point below the melting point or glass transition temperature of the carrier particles, so that the surface can be heated to the melting point of the polymer for adhering the carrier particles to the surface without adversely affecting the structural integrity of the particles. Suitably the polymer may have a melting point that is also below the melting point of any surface-attached chemistry on the particles. Advantageously the polymer may have a high density (low porosity) so it does not absorb reagents during use of the surface. In some embodiments, the polymer may have a melting point below about 100 C., suitably below about 75° C. The polymer may have a density of greater than about 1 g/cm³.

The polymer may be sticky and/or viscous at its melting point. For instance each site may be functionalised with a layer of polyester, for instance aliphatic polyester, such as an aliphatic homopolymer. In some embodiments, polycaprolactone may be used having a melting point of about 60° C. and a density of about 1.145 g/cm³.

Suitably, the polymer may be applied to the surface by spin coating. For instance a layer of polycaprolactone dissolved in a suitable solvent such, for example, as dichloromethane and/or toluene, may be applied to the surface by spin coating to give a thin film of substantially uniform thickness—e.g. about 100 nm. In some embodiments, 1% polycaprolactone dissolved a solution a 1:4 mixture of dichloromethane and toluene may be spun-coated at about 3,000 rpm.

The specific functional property is confined to the functionalised sites. In some embodiments, the spaces between the functionalised sites may be left untreated.

Alternatively, the spaces between the sites may be coated with a low-energy material. Suitably said low-energy material may be hydrophobic and/or lipophobic, having a low surface energy. Advantageously, the spaces between functionalised sites may be treated with a fluorocarbon. Where a glass, silica or silicon surface is used, said fluorocarbon may suitably comprise a perfluoroalkylsilane that is chemically bonded to the surface between the sites. For instance in some embodiments the surface may be treated between the sites with trichloro-fluoroalkylsilane This may be advantageous where each functionalised site comprises a coating of low melting point polymer as mentioned above, since the polymer will not adhere to the fluorocarbon surface between the sites, so that the functional property can be more accurately confined to the functionalised sites. After application to the surface as a thin film as described above, the low melting point polymer may be heated to a high temperature—e.g. in excess of 150° C. or 200° C. (255° may be suitable in the case of polycaprolactone)—causing or allowing the polymer film to melt and reticulate from the spaces between the sites onto the functionalised sites.

A low-energy surface coating between the sites may also assist in the removal of the masking material that remains in the first phase in step (d) of the method of the invention, and in reticulating the masking material in step (e) to coat the selected sites in a manner similar to the low melting point polymer described above.

Alternatively, in some embodiments, the spaces between the sites may advantageously be treated with an agent comprising free alkyl or haloalkyl group, e.g. chloroalkyl. Where a glass, silica or silicon surface is used, said agent may suitably comprise a $C_{1-12}$ alkyl- or haloalkyl-silane that is chemically bonded to the surface between the sites. For instance in some embodiments the surface may be treated between the sites with trichloro(octyl)silane.

Advantageously, each functionalised site may be derivatised such that it is reactive, for example chemically reactive, with one or more extrinsic reagents. In some embodiments, each functionalised site may be derivatised with a surface-bound molecular precursor that is capable of reacting with one or more reagents, such as molecular chain extenders, that may applied to the surface in use. Said molecular precursor may comprise a reactive chemical moiety, such for example as a reactive internal or terminal group. In some embodiments, said molecular precursor may comprise a linker for synthesising a surface-bound oligonucleotide, peptide, oligosaccharide or "Click chemistry" product. Alternatively, said molecular precursor may comprise a free terminal reactive moiety, such as a terminal amino group, of an attachment agent of the kind described above.

In other embodiments, the molecular precursor may itself comprise an oligonucleotide, a peptide, oligosaccharide or "Click chemistry" tag that is to be extended.

The molecular precursor may be bound directly to the surface. Suitably the molecular precursor may be bound to the surface by a suitable attachment agent as described above. Thus, for example, the molecular precursor may comprise a linker that is anchored to the surface through an alkythiol or alkylsilane and has a free terminal reactive group. The linker may be bonded to the terminal functional group of the thiol or silane attachment agent. Such an arrangement is well known to those skilled in the art of fabricating oligonucleotide or protein microarrays.

In some embodiments the molecular precursor may be bound to the surface indirectly through one or more carrier particles, such as beads, as mentioned above. Thus, in some embodiments, as described in more detail below, the molecular precursor may be bound at each site to a bead, which bead, or other carrier particle is attached to the surface at each site, for instance by means of a surface coating of a low melting point adhesive polymer of the kind described above. Carrier beads having a diameter of the order of about 0.1-2 µm may be employed, e.g., 0.5 µm polystyrene beads of the kind known in the art. The beads may comprise a plurality of surface-bound linkers suitable for oligonucleotide, polypeptide, polysaccharide or "Click chemistry" synthesis. In some embodiments the beads may carry a linker having two ends, one of which is attached to the bead and the other has free terminal reactive group or is bonded to a short oligonucleotide, a peptide, oligosaccharide or "Click chemistry" tag that is to be extended. In some embodiments, the beads may all carry the same tag.

Whilst theoretically there could be a single molecular precursor bound at each site, in practice there will usually be many copies of the molecular precursor at each site, which may be immobilised directly on the surface at the site as described above, or carried on beads. Multiple beads may be present at each site. Suitably the beads may form a single layer of beads at each site.

The sites may be arranged regularly or irregularly on the surface. Typically, the spacing between sites is less than about 10 µm and, in some embodiments, less than about 5 µm, e.g., about 4 µm. With the spacing between sites of this order, an array of at least 1 million sites can be fabricated. In some embodiments where the surface is formed on a silicon chip as described below, the spacing between sites may be of the order of 100-500 nm, permitting the fabrication of an array with of the order of 100 million sites. An array in accordance with the invention may comprise at least 100 sites, and usually more than 1000 or 10,000 sites. Typically an array in accordance with the invention comprises at least 100,000, 250,000, 500,000 or 1,000,000 sites. In some embodiments, the array may comprise more than 10 million sites, or more than 100 million sites, and sometimes more than 1 billion sites.

Suitably, the sites may be provided on the surface of a suitable substrate. The surface may be substantially planar.

In some embodiments, the substrate may comprise an optically transparent substrate, for instance an optically transparent slide. The substrate, or slide, may be made from glass or another form of fused silica, or from sapphire. The surface may comprise the same material as the substrate or it may be different. For example, in some embodiments, a silicon substrate may be fabricated with a silica surface layer.

The heating element at each site may comprise a metal plate or wafer that is attached to the surface on an obverse face of the substrate. The metal plate at each site serves as a target for a directed beam of electromagnetic radiation, for example a laser, which serves to generate the thermal energy at the selected sites. Suitably an ultraviolet or blue light laser having a wavelength of about 355 nm or 405 nm may be used; for example a Q-switched pulsed UV laser. The beam may be directed at the metal plate through a reverse face of the substrate. It will be understood therefore that the substrate should at least be optically transparent to the wavelength of the electromagnetic radiation.

Suitably, each heating element may comprise a thin disk or other shaped piece of metal selected from gold, platinum, chromium, tantalum, copper or aluminium. The metal plate may have a thickness of the order of 50-500 nm, suitably 100-300 nm, e.g., about 200 nm, and may have a maximum length in the plane of the surface of about 1-5 µm, e.g., 2-3 µm. In some embodiments, the heating elements may comprise metal discs having a diameter of about 2 µm arranged on a pitch of about 3-5 µm, but those skilled in the art will appreciate that the precise shape of the heating element is not essential and any desired shape may be used. For instance, in some embodiments, the heating elements may be formed as elongate tracks on the surface. Said tracks may have a width of less than about 10 µg, suitably less than about 5 µm and in some embodiments less than about 2-3 µm.

Suitably "over-thick" metal wafers may be applied to the surface at the sites, and then the wafers may be ablated to the required thickness. For instance, metal wafers having a thickness greater than about 10 µm may initially be adhered to the surface, and the wafers may then be ablated to a thickness within the range mentioned above.

In some embodiments, the surface may be etched to define the locations of the sites. For instance, at each site, the surface may be slightly raised from the surrounding areas. In practice, this may be achieved by etching away the substrate material in the surrounding areas, leaving the surface standing slightly proud from the surrounding areas at the sites. In this way, the surface may define a thin "mesa" of a suitable shape at each site. The mesa may have a substantially flat upper surface to which the metal wafer is attached.

In an advantageous embodiment, the metal plate or wafer may be dimensioned and attached to the upper surface of the mesa at each site so as to overhang the edge of the mesa to form an undercut topology between the upper surface of the mesa and the metal plate or wafer. This may be advantageous where functionalised sites comprise a coating of a low melting point polymer for attaching carrier particles as described above, especially where a low-energy surface such as fluorocarbon is provided in the spaces between the sites. In such embodiments, as the low melting point polymer is melted at high temperature after deposition on the surface as a film, it reticulates from the spaces between the sites onto the functionalised sites, and flows into the undercut region beneath the edge of the metal plate or wafer. Upon subsequent cooling the low melting point polymer solidifies to form a cap over each mesa and the metal plate or wafer thereon, which is thus physically anchored by the engagement of the polymer in the undercut region, such that the cap 'grips' the metal plate or wafer. This arrangement advantageously protects the low melting point polymer from delaminating from the metal plate or wafer in use, for instance in case volatile extrinsic solvents are applied to the surface, even if such solvents are able to migrate into the interface between the metal plate or wafer and the low melting point polymer coating.

In a similar manner, this arrangement may also serve advantageously to retain the masking layer on the selected sites as described below.

The spaces between the metal plates or wafers may be left untreated or may be coated with a low-energy coating, such as a perfluorocarbon as described above.

Alternatively, the substrate may comprise a silicon chip. The silicon chip may comprise a micro-heater formed in or on the silicon chip at each site. The micro-heater may comprise a selectively operable heating element for generating thermal energy at each site.

Any manner of producing such a micro-heater with a heating element known to those skilled in the art may be used, including, for example, direct resistive heating using a miniaturised conductive (e.g., metal, for example copper, aluminium or gold; or carbon, for example a diamond or glassy carbon film) or semi-conductive (e.g., polysilicon) heating element at the site, doping the chip at each site with a suitable semiconductor, or by selectively supplying an alternating current at the site through an imperfect capacitor. In some embodiments, each micro-heater may comprise a heating element having a serpentine or other convoluted track formed of electrically conducting material. The heating element may be formed on the surface of the silicon chip or buried beneath an appropriate barrier layer.

In some embodiments the micro-heater may comprise a heating element on the surface of the chip or embedded within the chip, a driver circuit that is responsive to data control, and a connector between the driver circuit and the heating element.

As mentioned above, the surface of the chip may be made of the same material as the chip or it may be different. Thus, the chip may be fabricated with a silica surface, for example.

In some embodiments, the surface of the chip may be patterned to differentiate between the sites and spaces between the sites. This is desirable so that an attachment agent of the kind described above binds only to the surface at the sites. Thus, the surface of the silicon chip may be formed from a first material at the sites and from a second different material between the sites. The first material may be capable of binding to an attachment agent. Suitably the first material may comprise silica, e.g., silicon dioxide, for binding to a silane attachment agent, or a noble metal, e.g. gold, for attachment to a thiol attachment agent. In yet another alternative, the first material may comprise carbon, e.g. diamond. When the first material comprises silica, the second material may comprise a noble metal such as copper that does not react with a silane attachment agent.

In some embodiments, the silicon chip may carry a metal plate or wafer at each site of a kind similar to the metal targets used in the embodiments described above. The metal plate or wafer may comprise a disk, track or other shaped piece of metal selected from gold, platinum, chromium, tantalum, copper or aluminium, or a doped polysilicon. The metal plate or wafer may serve as a resistance heating element by passing current from a respective driver circuit embedded in the silicon chip. Alternatively the metal plate or wafer at each site may be connected to or placed in close proximity to a respective separate heating element of one of the kinds mentioned above that is embedded within the chip.

The metal plate or wafer should be thermally connected to the separate heating element and may also be electrically connected thereto, which may be advantageous in some applications of the array. In some embodiments, the heating element may be embedded in the chip, and a metal plate may be provided on the surface of the chip above the heating element, such that the thermal energy from the heating element, when it is actuated, is transmitted to the plate through the body of the chip. In some embodiments, the chip may comprise a silicon substrate fabricated with a silica surface and metal plates or wafers at the sites.

In some embodiments an adhesion agent may be used to assist in adhering the metal plates or wafers to the surface of the chip at the sites. For instance chromium may be used as an adhesion agent, which is especially suitable for promoting adhesion between gold plates or wafers and a silica surface such as silicon dioxide.

The metal plate or wafer at each site may have a thickness of the order of 10-100 nm and may have a maximum length in the plane of the surface of about 1 µm. In some embodiments, the sites may comprise metal discs having a diameter of about 1 µm arranged on a pitch of about 2 µm, but those skilled in the art will appreciate that the precise shape of the heating element is not essential.

Advantageously, the surface of the chip between the sites may be etched away in the manner described above to form a raised portion or mesa at each site, and the metal plate or wafer may be shaped and dimension to overhang the edge or edges of the mesa forming a topological anchor for the masking material in the manner described above, with the same technical advantages.

Where the silicon chip comprises a metal plate or wafer at each site, the spaces between the sites may be coated with a low-energy material, e.g. a fluorocarbon, also as described above.

In accordance with step (b) of the method of the invention, the masking material is applied to the surface for masking selected ones of the sites during use of the surface, for example in the manners described in more detail below. Where the sites are functionalised with one or more carrier particles, such as beads, it will be appreciated that the masking material is applied so as to cover the particles.

By "masking" herein is meant that the selected ones of the sites are not accessible to extrinsic reagents that may be applied to the surface, while the non-selected sites, which remain unmasked, are accessible to such reagents. The nature of the masking material will depend on the kind of extrinsic reagents that may be applied to the surface during use of the array. Where functionalised sites are derivatised, for instance with a molecular precursor, such that they are reactive with one or more extrinsic reagents, the masked sites should remain protected from such reagents such that they are not available to react, while the sites that are unprotected are available for reaction with the extrinsic reagents.

Suitably, the masking material consists of a waxy, non-polar organic substance having a melting point in the range 10-75° C. and the density greater than about 0.5 g/mL. A high density, non-porous masking material is desirable to prevent the diffusion or ingress of other molecules into the masking material, thereby to protect the selected ones of the functionalised sites. In some embodiments, the masking material may have a density greater than about 0.7 g/mL. Conveniently, the masking material may have a melting point in the range 25-65° C. Suitably the masking material may have a low vapour pressure at room temperature, corresponding to a boiling point of greater than 200° C.

For use as the masking material, higher straight chain alkanes have been found to be especially useful, for example $C_{15}$-$C_{30}$ n-alkanes. Suitable alkanes have a melting point between about 15° C. and about 60° C. n-Alkanes are waxy, non-polar substances with a high density that exist in a substantially non-crystalline phase and therefore have fewer crystal defects that may give rise to flaws in the masking layer. Suitably, said masking material may comprise one or more $C_{17}$-$C_{28}$ n-alkanes or $C_{18-24}$ n-alkanes.

In general, an n-alkane masking material may suitably be used to mask the selected sites with respect to extrinsic reagents having melting points significantly higher than the n-alkane, for instance at least 20° C. higher, and preferably at least 30° C., 40° C. or 50° C. higher, that comprise a polar solvent, e.g. dichloromethane or acetonitrile, or have a lower surface energy than the n-alkane, e.g. perfluorocarbons such as perfluorodecalin.

Tetracosane ($C_{24}$) has been found to be especially suitable for use as the masking material. Tetracosane has a melting point in the range 48-54° C. and a density of about 0.80 g/mL. Tetracosane may be used alone or in combination with one or more other higher straight chain alkanes.

Icosane ($C_{20}$) has also been found to be or use as the masking material. Icosane has a melting point in the range 36-38° C. and a density of about 0.79 g/mL. Icosane may be used alone or in combination with one or more other higher straight chain alkanes, such as octadecane ($C_{18}$), nonadecane ($C_{19}$), docosane ($C_{22}$) or tetracosane.

In some embodiments, the masking material may comprise a mixture of two or more higher straight chain alkanes, for example $C_{16}$-$C_{30}$ n-alkanes or $C_{18}$-$C_{28}$ n-alkanes. It has been found that a mixture of two or three higher straight chain alkanes produces a substance that exists in a glassy state with fewer microcrystalline defects. In some embodiments the chain length of the two or three higher alkanes may differ by 1-2 carbon atoms.

Two higher straight chain alkanes maybe mixed in the ratio 1:4 to 4:1, suitably 1:2 to 2:1, and typically approximately 1:1. In one embodiment, the masking material may comprise a mixture of icosane and docosane, which may be mixed in approximately equal proportions. In another embodiment, the masking material may comprise icosane and octadecane, which may likewise be mixed in approximately equal proportions.

In another embodiment the masking material may comprise a mixture of higher straight chain alkanes in approximately equal proportions, for example icosane, docosane and octadecane, or octadecane, nonadecane and icosane.

Conveniently, the masking material is applied to the surface in a first removable phase that is particulate. By "removable" herein means that the masking material in the first phase does not adhere to the surface (or to the carrier particles where present) and can easily be removed from the non-selected sites in step (d).

In some embodiments, the first phase of the masking material may comprise fusible nanospheres. Said nanospheres may have a diameter in the range 10-50 nm or 20-40 nm. The masking material should be deposited on the surface at a temperature below the freezing point of the masking material. Where the masking material consists of tetracosane, for example, a suitable temperature is about 30° C. In this respect, the Gibbs-Thomson effect may produce a slight melting point depression dependent on the size and morphology of the particles.

The particulate masking material, for example nanospheres, may be deposited on the surface in the form of a dispersion, for example in acetonitrile. For this, a 10% solids by mass nanosphere dispersion has been found to be suitable. In some embodiments, the nanospheres may be deposited on the surface by floatation in a higher density liquid phase, with the surface held upside down. For this purpose, a high-density liquid perfluorocarbon may be used, such for example as perfluorodecalin, which has a density of about 1.9 g/mL.

After depositing the dispersion on the surface, the liquid phase may be removed by evaporation, for example under vacuum (e.g., 1 millibar), to leave a layer of dry, particulate masking material. The resultant layer may have a thickness of about 10 μm.

According to step (c) of the method of the invention, thermal energy is then applied to the masking material at the selected ones of the sites to cause or allow the masking material to undergo a first localised phase change to a second surface wetting phase at the selected sites. Suitably, this step is also carried out under reduced pressure, for example under vacuum of about 1 millibar.

By a "surface wetting phase" herein is meant that as a result of the thermal energy applied to the masking material at the selected ones of the sites, the masking material undergoes a phase change such that it adheres to the selected ones of the sites, such that it is selectively retained on the surface when the masking material in the first phase at the non-selected ones of the sites is removed in step (d).

At this stage, the masking material in the second phase may be attached only weakly at the selected ones of the sites, provided that the strength of attachment is sufficient to allow separation of the masking material in the first and second phases from each other. Where the first phase of the masking material is particulate, for example nanospheres, the application of thermal energy in step (c) may cause the particles partially to melt and coalesce. This assists in retaining the masking material in the second phase at the selected ones of the sites.

A key feature of the present invention is that the application of thermal energy in step (c) may be carried out to procure the phase change the masking material from the first removable phase to the second phase without substantially increasing the temperature of the masking material at the selected ones of the sites. This is important to ensure accurate masking of the selected sites, without masking the non-selected sites, thereby ensuring the final resolution of the mask. Thus, at the selected ones of the sites, sufficient thermal energy should be applied to the masking material to procure the phase change from the first phase the second phase without significantly increasing the temperature of the masking material. It will be understood that the thermal energy applied to the masking material at the selected ones of the sites should therefore be absorbed as latent heat of fusion to melt the masking material. A "melt zone" may extend around each of the sites in the manner of a cap over each of the sites. Outside of the melt zones the masking material remains in the first phase and can easily be washed away in step (d).

Suitably, the thermal energy may be applied transiently to the masking material at the selected ones of the sites. A short pulse of energy having a duration of, for example, about 5-20 ns, e.g. about 10 ns, allows the heat to disperse into the substrate before a larger area of masking material can melt. The energy delivered by the pulse should be sufficient to provide heat of fusion for a volume of nanoparticles of masking material extending about 200 nm from the area of the site.

To achieve a greater melting and coalescence of the masking material within a limited area, a series of discrete heating pulses may be used, each pulse being separated by period of cooling. For example, a series of 1,000-20,000, suitably 5,000-10,000, heating pulses of about 0.5-2 ns duration, e.g. about 1 ns, with about 0.5-2 µs, e.g. about 1 µs, of cooling between each pulse may be suitable.

Where each site comprises a metal plate or wafer that serves as a target for a laser as described above, the energy delivered by the pulse should be sufficient to raise the temperature of the metal plate or wafer by about 25° C. (e.g., from about 30° C. to about 55° C.) Allowing for coupling inefficiencies, nanoparticle size etc., this equates to about 50 pJ to about 5 nJ per laser heating pulse. In some embodiments, pulses of about 1 nJ have been found to be suitable.

In some embodiments, the second phase of the masking material may be sufficiently well adhered to the surface and non-porous to serve as a mask at the selected ones of the sites. However in some embodiments, the masking material at the selected sites may require further annealing with optional step (e) to produce the final mask, as described in more detail below.

The thermal energy may be applied to the selected ones of the sites simultaneously, but alternatively it may be desired to stagger the application of thermal energy to the selected sites in order to allow for more efficient diffusion of thermal energy away from a selected site following the application of thermal energy. Suitably, the application of thermal energy to the selected sites is carried out so that adjacent sites are not heated simultaneously and optionally not immediately one after another. Thus, in accordance with the invention, the selected sites may be heated group-wise, with the members of each group being selected to avoid heating adjacent sites simultaneously or directly one after another. Where the substrate comprises a silicon chip with micro-heaters, this arrangement may also allow a more uniform power loading of the chip during actuation.

The supply of thermal energy to the selected sites may suitably be carried out under data control. Thus, where a laser or other directed beam of electromagnetic radiation is used to deliver energy to a metal target on the surface at each site, a scanning laser may be used that is controlled to direct energy transiently to the selected sites to produce the desired phase change in the masking material as described above. A scanning laser is capable of writing data at a speed of up to about 100 kbits/s. The scanning laser is suitably controlled by a computer.

Where micro-heaters are used, the silicon chip may comprise one or more control logic elements that can store and respond to control data supplied, e.g. from a computer, for selectively operating the micro-heater driver circuits. The use of such a silicon chip in accordance with the invention is advantageous not only because of the greater concentration of sites that may be provided on the surface, as mentioned above, but also because of the greater data writing speed that can be achieved. For instance, a typical chip may comprise a 256 bit data interface operating at 100 MHz, thus providing a chip bandwidth of 25.6 Gbits/s.

In some embodiments, a single control logic element may be used to control a cluster of individual micro-heaters. For instance, a single control logic element may be used to control a cluster of 16 micro-heaters. (In other embodiments the cluster size may be 4, 8, 32 or 64 micro-heaters). The control data may be transmitted to the control logic element by one or more shift register chains for storing successive sets of instructions for the cluster of micro-heaters. For example, the control data may be sent as a sequence of 16 bit words along one or more chains of 16-bit logic control elements, such that when the data has been transmitted, each 16-bit word corresponding to a control logic element is stored in the control logic element itself. Suitably, data scan chains delivering data from the computer to the control logic element may comprise a 16-bit wide scan chain of latched logic shift registers operating with a data write bandwidth of, for example, 100 MHz, i.e. 1.6 Gbits/s.

A control signal may then be sent from the computer to initiate a sequence of micro-heater actuations by each control logic element in parallel. For instance, a single site within each cluster may be actuated simultaneously, which would allow a group of one sixteenth (for a cluster size of 16 sites) of the total number of sites to be actuated in parallel. For a chip comprising a billion sites, this means that about 50 million sites would be activated concurrently. In order to allow for efficient power distribution on the chip, these actuation events may be staggered further by means of a controlling clock sequence so that in practice only 10,000 actuations (for example) are effected concurrently in any) 100 µs period, thus providing for actuation of a billion sites over a period of roughly 10 seconds, a more uniform power loading of the chip during actuation, and a lower required thermal dissipation from the substrate.

After completion of the localised phase change of the masking material at the selected ones of the sites, the masking material that remains in the first phase at the non-selected sites is removed in step (d). This may suitably be achieved by washing the surface using a suitable immiscible volatile solvent, such as polar solvent, e.g. acetonitrile, or a fluorocarbon such as perfluorohexane, which serves to displace the masking material in the first phase from the surface. A perfluorocarbon may be less likely to disturb the adherence of the masking material at the selected ones of the sites if it is not fully wetted and annealed to the surface. For this step, the pressure above the surface may be returned to 1 bar under an inert gas such as nitrogen.

After removal of the unadhered masking material in the first phase, the surface may then be dried, and this may be suitably achieved under vacuum.

As described above, in some embodiments the masking material in the second phase at the selected sites may be sufficiently well adhered to the surface and may be sufficiently non-porous to serve as a mask. However, in other embodiments, the masking material in the second phase, while attached to the surface, may require further stabilisation on the surface and may remain somewhat porous, necessitating further treatment before it can be used as a mask as described below.

Thus, in some embodiments, after removal of the excess masking material that remains in the first phase, and drying the surface, the masking material may be further treated in step (e) at the selected sites to undergo a further phase change to a third non-porous phase that serves to fully wet the selected sites.

To this end, the masking material may be annealed by the further application of thermal energy. Suitably, the masking material may be annealed at the selected sites by raising the temperature of the masking material above its melting point to form a high packing density molecular state. Suitably this may be done under reduced pressure, for example under vacuum. For instance, where tetracosane is used as the masking material, the temperature may be raised to about 55° C. After removal of the masking material that remains in the first phase at the non-selected sites, annealing of the masking material at the selected sites can be accomplished by selectively heating the selected ones of the sites, or by raising the temperature of the entire surface.

In this way, a uniform, high density layer of the masking material may be formed at each of the selected sites which serves to mask those sites and render them inaccessible to extrinsic reagents that may be applied to the surface, while allowing such extrinsic reagents to reach the non-selected functionalised sites, as described above.

Advantageously where the surface comprises a low-energy coating, such as a fluorocarbon, between the sites, this may assist in confining the masking material to the selected sites, preventing it from wetting the interstitial surface and spreading to neighbouring sites. As the masking material is melted at the selected sites, its surface tension tends to draw it onto the sites, and this reticulation effect will be enhanced by the use of a low-energy surface between the sites.

Further, as mentioned above, where the surface at each site comprises a raised portion—or mesa—which carries a metal plate or wafer that overhangs the raised portion at its edges or edges, the masking material reticulates as it melts and flows into the undercut to form a cap over the mesa that is physically anchored by the engagement of the masking material cap beneath the overhang, when the masking material is subsequently cooled and solidifies. This may be especially advantageous where volatile extrinsic solvents are subsequently applied to the surface during use, which might attack the bond between the masking material and the surface.

According to the second aspect of the present invention therefore a method is provided for masking the selected ones of the sites of the array. Once the selected ones of the sites have been masked, the non-selected sites can be treated with one or more extrinsic reagents to modify the non-selected sites in some manner.

The present invention is not limited to any particular reactions or treatments that may be performed at the non-selected (exposed) sites, and numerous applications for the methods of the present invention will be apparent to those skilled in the art.

In a particular aspect of the invention, the sites may comprise functionalised sites that are derivatised with a molecular precursor as mentioned above, and according to the second aspect of the invention the non-selected sites may be reacted with an extrinsic molecular chain extender suitable for extending the molecular precursor for surface-bound molecular assembly such, for example, as surface bound oligonucleotide, peptide, oligosaccharide or Click chemistry synthesis.

The masking method of the second aspect of the invention may therefore be used in a method of molecular assembly in which a plurality of the sites are functionalised and derivatised with a molecular precursor, selected ones of the sites are masked according to the invention, and the molecular precursors at the non-selected, unmasked sites are then extended using such a chain extender. In this way, molecular assembly can be controlled so that a given chain extender is only added to the molecular precursor at the sites that are not masked. By controlling which sites are masked in accordance with the invention, the addition of the given chain extender can be directed only to the unmasked sites.

A basic component of information processing hardware is the latching gate which can be set either to a "gate open" state that allows information to flow from the input to the output, or to a "gate closed" state where no information flows. The present invention provides an analogous, digitally controllable, resettable, latching, transiently activated chemical gate on the surface of a silicon chip or other substrate, allowing for an efficient coupling between digital information and molecular processing. Such a device may form a basic element of an electronic/chemical computer, and in particular may allow for the efficient synthesis of molecules from data, such, for example, as oligonucleotides (e.g. DNA, RNA), peptides, polysaccharides and others, for example, Click chemistries.

The molecular precursor suitably comprises a protected free terminal reactive group which is de-protected prior to or after masking the selected sites. In some embodiments, the free terminal reactive group may be de-protected before masking the selected sites. In this way, the molecular precursors at all of the functionalised sites are de-protected simultaneously. However, in some embodiments it may be preferred only to de-protect terminal reactive groups on the precursors at the unmasked sites.

The molecular chain extender may comprise an unprotected first reactive group that is capable of reacting with the free terminal reactive group on the precursor for joining the chain extender to the precursor. The chain extender may also comprise a protected second reactive group which terminates the reaction at each functionalised site after the addition of one chain extender molecule. It will be appreciated that the precursors at all of the non-selected sites will be extended using the same extender.

Suitably the second reactive group on the chain extender is the same as or similar to the terminal reactive group on the molecular precursor. The reactive group on the precursor and the second reactive group on the extender may be protected with the same or same kind of protecting group.

In some embodiments, the masking material in the second (or third phase) may then be removed from all of the masked sites by dissolving said masking material in a suitable solvent therefor such, for example, as a lower alkane, i.e. $C_{3-8}$ alkane, e.g. pentane or 2-methylbutane.

Thereafter, the surface may be re-masked in accordance with the method of the second aspect of the invention, such that at least some of the previously masked sites remain unmasked. Optionally, the previously unmasked sites may be masked. If necessary, the terminal reactive groups on the newly unmasked precursors are de-protected. A different chain extender may then be deposited on the surface for reaction with the newly unmasked sites. Again, the chain extender comprises a protected second reactive group, so the reaction terminates after one chain extension reaction. Each different chain extender may suitably comprise a different residue but the same or similar first and second reactive groups.

This process may be repeated for a plurality of cycles, each time using a different chain extender. Within each cycle, a smaller sub-set of the sites masked in all previous cycles (and optionally sites that have been unmasked in an earlier cycle where chain extension has occurred) is re-masked until all the molecular precursor at all functionalised sites has been reacted with a chain extender. It will be appreciated that in the last cycle, it may be unnecessary to mask any of the sites, unless it is desired to mask sites where chain extension has already occurred.

The total number of cycles will depend on the number of different chain extenders to be used. Thus, for example, in the case of oligonucleotide synthesis, there may be four cycles—one using each of the four different naturally occurring nucleotides (more cycles will be needed if artificial nucleotide analogues are used). In the case of peptide synthesis, there may be up to 22 cycles if only the standard amino acids are used, but more cycles if non-standard amino acids are also employed.

An advantage of de-protecting the terminal reactive groups on the molecular precursors at all functionalised sites, prior to masking the surface is that it is unnecessary to de-protect the molecular precursors prior to each cycle, and only one de-protection step is required for all of the cycles.

An advantage of de-protecting the terminal reactive groups on the molecular precursors only at the unmasked sites after masking the surface is that it is unnecessary to carry out chain extension synchronously across all of the functionalised sites, such that all of the sites must be extended by chain extender residue before chain extension can be repeated at any given site. In other words, within each cycle, the sites that it is desired to extend by one further chain extender residue may be unmasked and the molecular precursors at those sites de-protected, regardless of whether all, or only some, of the sites on the surface have been extended to the same degree. In some embodiments therefore the method of molecular assembly of the present invention may be repeated for a number of cycles, such that within each cycle any selected one or more sites are unmasked and the molecular precursor is de-protected at those sites to allow chain extension to occur. In this way, molecular assembly may occur at different rates at the different sites on the surface, and it is unnecessary for the molecules "grown" at all sites to have the same length.

Instead of removing all of the masking material after each cycle, the masking material in the second (or third phase) may be removed selectively from one or more selected ones of the previously masked sites, and the newly unmasked sites treated with a different chain extender.

Thus in some embodiments the method of the invention may further comprise removing the masking material in the second (or third) phase from one or more selected ones of the sites previously selected in step (c) by:

(f-1) depositing an organic co-solvent on the surface while maintaining the surface at a temperature at or near to the freezing point of the co-solvent; and then (g-1) applying energy at the selected masked sites to melt the masking material;

whereby the masking material in the second or third phase is dissolved by the co-solvent at the selected previously masked sites.

Said co-solvent may suitably comprise a low vapour pressure organic solvent for said masking material. In some embodiments said co-solvent may comprise a straight chain alkane having a melting point lower than the masking material. For instance, the melting point of the solvent may suitably be at least 20° C. or 30° C. lower than the melting point of the masking material. The solvent may be a $C_{10-20}$ alkane, typically $C_{14-18}$ alkane, e.g. hexadecane which has a melting point of about 19° C.

The surface should be held at or close to the freezing point of the co-solvent, for instance within 0.5-1° C., and then thermal energy is selectively applied at the selected masked sites where it is desired to remove the masking material. This thermal energy may be applied in a manner similar to the application of thermal energy in step (c) of the method of the invention and should be sufficient to pay the latent heat of fusion of the masking material at the selected masked sites, without raising the temperature of the masking material, so that adjacent masked sites remain unaffected.

In some embodiments, the co-solvent may advantageously comprise a dispersion of nanoparticles of the masking material. The nanoparticles may have a diameter in the range 10-50 nm or 20-40 nm. Conveniently the nanoparticles may be the same as the ones that may be used to deposit the masking material to the surface in step (b). In the presence of the bulk masking material on the surface, the smallest nanoparticles are preferentially melted owing to the Gibbs-Thompson effect, eventually forming a saturated solution. As more of the nanoparticles are melted and dissolved in the co-solvent, masking material is gradually deposited out of solution onto the surface, so that the bulk masking material on the surface is stable even in the presence of the co-solvent, and is only melted and dissolved at the selected masked sites where thermal energy is locally applied. This helps to ensure that masking material is not removed from sites where that is not desired.

Alternatively, in some embodiments, the method of the invention may further comprise removing the masking material in the second (or third) phase from one or more selected ones of the sites previously selected in step (c) by:

(f-2) depositing a polar fluid on the surface; and then (g-2) applying energy at the selected masked sites to melt the masking material;

whereby the masking material is displaced from the surface by the polar fluid at the selected previously masked sites.

In accordance with this aspect of the invention, the localised melting of the masking material at the selected masked sites causes a further localised phase change to a fourth phase. Melting of the masking material in the second or third phase causes expansion of the masking material with a concomitant increase in molecular disorder and reduction in packing density, such that the resulting fourth phase is characterised by a degree of porosity.

The polar fluid is immiscible with the masking layer, and the porosity of the masking material in the fourth phase allows the polar fluid to displace the masking material from the surface at the selected masked sites, since the surface has a greater affinity for the polar fluid than it has for the masking material. In this way the masking material can be selectively removed from the one or more selected ones of the previously masked sites.

Suitably the polar fluid has a boiling point of at least 75° C. The fluid may have a polarity index of at least $6.0^1$. Suitably, the polar fluid may have a freezing point of less than about 5° C.

[1] See Solvent Guide, Burdick & Jackson Laboratories, 1984

Thus, in some embodiments, the polar fluid may be selected from water, propylene carbonate and acetonitrile. Other suitable polar fluids will be known to those skilled in the art, including, for example, N,N-dimethylformamide, dimethyl acetamide and N-methylpyrrolidone.

In this way, after each successive cycle of chain extension, additional, previously masked functionalised sites can be unmasked for the next cycle with a different chain extender.

In some embodiments, it may be desirable to mask previously unmasked sites where chain extension has already occurred to protect the extended molecular precursor—for instance where de-protection of the unmasked sites is performed within each cycle.

In accordance with the invention, therefore, the unmasked sites can be selectively masked by:

(h) depositing masking material in said first removable phase on the surface to cover at least said unmasked sites;

(i) applying thermal energy to the masking material at least at said unmasked sites to cause or allow the masking material to undergo a first localised phase change to said second surface wetting phase at least at said unmasked sites; and (j) removing the remainder of the masking material in the first phase from the surface.

As in step (c) above, the second phase of the masking material produced in step (i) may be sufficiently well adhered to the surface and non-porous to serve as a mask at the previously unmasked sites. However in some embodiments, the masking material at the previously unmasked sites may require further annealing in a manner similar to step (e) described above.

Thus in some embodiments the method may further comprise:

(k) after step (j) treating the masking material at least at the previously unmasked sites to undergo a second further phase change to said third non-porous phase that serves to mask the previously unmasked sites.

Once chain extension has taken place at all of the sites, any remaining masking material on the surface may be removed by dissolution in a suitable solvent as described above, and the protected second reactive groups on the chain extenders may then be removed. Thereafter, the entire process may be repeated for one or more further rounds, each round comprising a plurality of cycles as described above, so that one or more further chain extender molecules are added at each site. It will be understood that for each round after the first, the de-protecting step involves de-protecting the second protected reactive group on the chain extender residue added at each site during the immediately preceding round, instead of de-protecting the molecular precursor.

The total number of rounds of molecular assembly will depend upon the length of the intended products. In the case of oligonucleotide synthesis, up to about 200 rounds may practically be performed to produce oligonucleotides of up to about 200 nucleotide residues in length. More typically, between 5-100 rounds may be performed, for instance 10-25 rounds.

In the case of polypeptide synthesis, typically up to about 75-100 rounds is the practical limit of solid-phase peptide synthesis, and in accordance with the invention typically 5-50 rounds may be performed, more typically 5-25 rounds to produce polypeptides of 5-25 amino acids length.

In accordance with a third aspect of the invention therefore there is provided a method of synthesising an array of molecules, said method comprising the steps of:

(1) providing a surface defining an array of functionalised sites, wherein each site comprises a heating element, and the surface is derivatised at a first plurality of said sites with a surface-bound molecular precursor having a protected free terminal reactive group;

(2-1)(i) de-protecting the terminal reactive group on the precursors at the first plurality of functionalised sites and then (ii) masking one or more selected ones, but not all, of the first plurality of sites in accordance with the second aspect of the present invention, leaving unmasked the sites that are not selected, or (2-2)(i) masking one or more selected ones, but not all, of the first plurality of functionalised sites in accordance with the second aspect of the present invention, leaving unmasked the sites that are not selected, and then (ii) de-protecting the terminal reactive group on the precursors at the unmasked sites;

(3) and thereafter depositing on the surface an extrinsic molecular chain extender having a first unprotected reactive group that is capable of reacting with the free terminal reactive group on the precursor for joining the chain extender to the precursor, and a second protected reactive group, under reaction conditions suitable for causing or allowing said reaction to proceed at the unmasked sites; and (4) removing unreacted chain extender.

In some embodiments, the first plurality of sites may comprise all or substantially all of the functionalised sites on the surface.

It will be understood that steps (2-1) and (2-2) of the method of the third aspect of the invention are alternatives, and each includes steps (b), (c), (d) and optionally step (e) of the masking method of the second aspect of the invention.

As indicated above, the terminal reactive groups on the molecular precursors may be de-protected prior to masking the surface in accordance with step (2-1)(i). In such case, all of the molecular precursors at the first plurality of functionalised sites will be de-protected simultaneously, with the molecular precursors at the selected sites subsequently being masked and thus rendered inaccessible for reaction with the chain extender. This may be advantageous where the reagents used for de-protecting the terminal reactive groups on the molecular precursors are prone to attack the masking material.

Alternatively, the terminal reactive groups at the unmasked sites may be de-protected after masking in accordance with step (2-2)(ii), so that the molecular precursors at the selected (masked) sites remain protected.

As mentioned above, in some embodiments, said molecular precursor may comprise a linker for synthesising a surface-bound oligonucleotide, peptide, oligosaccharide or "Click chemistry" product. In some embodiments, the molecular precursor may itself comprise an oligonucleotide, a peptide, oligosaccharide or Click chemistry tag that is to be extended. Thus, in some embodiments, the molecular precursor may comprise a linker for attachment to the surface at the first plurality of functionalised sites and an initial oligonucleotide, peptide, oligosaccharide or Click chemistry tag that is attached to the linker. It will be appreciated that in such case, all of the molecular precursors attached to the surface at the first plurality of functionalised sites may comprise the same tag.

In yet another alternative, the molecular precursor may simply comprise a free terminal reactive group such, for example, as an amino group, of an attachment agent of the kind described above such, for example, as an alkylthiol or alkylsilane, having alkyl chain of 2-6 carbons length, e.g. propyl, that serves to space the free terminal reactive moiety from the surface. Thus, in some embodiments, the molecular precursor may comprise an $C_{2-6}$aminoalkyl thiol or $C_{2-6}$aminoalkyl silane that is attached directly to the surface.

In some embodiments, the molecular precursor may comprise a linker and a short oligonucleotide tag comprising 1-10, typically 2-5 nucleotides. Suitably, the oligonucleotide tag is attached at its 3' end to the linker and has a free terminal reactive group at its 5' end.

In some embodiments, the molecular precursor may comprise a linker and a short oligopeptide tag comprising 1-10, typically 2-5 amino acids. Suitably, the oligopeptide tag is attached to the linker at its C-terminus, and has a free terminal reactive group at its N-terminus.

Said linker may be attached to the surface by means of a suitable surface attachment agent of the kind described above such, for example, as a thiol or an alkylsilane, depending on the nature of the surface. In some embodiments, the attachment agent may comprise a terminal amino group. Suitably the attachment agent comprises an aminoalkyl moiety such, for example, as aminomethyl or aminopropyl. In some embodiments, as known in the art, the aminoalkyl arm may be further extended to result in Long Chain Aminoalkyl (LCAA). The amino group may serve as an anchoring point for the linker. Any unreacted amino groups may be capped with acetic anhydride.

In some embodiments, the linker may be attached directly to the surface at the first plurality of functionalised sites. However, in other embodiments, the linker may advantageously be attached to carrier particles such as beads as described above, wherein the beads are attached to the surface at the first plurality of functionalised sites by means of a low melting point polymer such as polycaprolactone. A suitable attachment agent may be bound to the beads, with the linker attached to the attachment agent. An advantage of this arrangement is that carrier particles, such as beads, of the kind used in a conventional bead synthesis robot may be used. The beads may be pre-prepared with a suitable linker attached to their surface, e.g., by means of an attachment agent of the kind described above. In some cases, the linker may be attached to a short initial oligonucleotide, peptide, oligosaccharide or Click chemistry tag, which may be the same for all of the beads.

In some embodiments, the method of the third aspect of the invention may be particularly used for solid-state oligonucleotide synthesis. Thus, the linker may comprise a non-nucleosidic linker or a nucleoside succinate that is covalently attached to a terminal amino group of the attachment agent. Various suitable non-nucleosidic linkers are known to those skilled in the art.

As noted above, the linker may optionally be attached at its 5'-end to a short initial oligonucleotide tag.

Various different methods for solid-state oligonucleotide synthesis are known to those skilled in the art. These methods are well known to those skilled in the art and need not be described in detail herein. At the time of writing, the phosphoramidite method is preferred. For this method, regardless of whether the molecular precursor comprises a linker alone, or a linker connected to an initial oligonucleotide tag, the molecular precursor may comprise a protected 5'-terminal hydroxyl group. However, the present invention is not limited to any specific technique for oligonucleotide synthesis, and in other embodiments, it is envisaged, for example, that the molecular precursor may comprise a protected 5'-terminal O-phosphate group or a suitable derivative thereof.

Various suitable hydroxyl protecting groups are known in the art, but acid-labile DMT (4,4'-di-methoxytrityl) is well known and is commonly used for oligonucleotide synthesis. In steps (2-1)(i) and (2-2)(ii), the protecting group may be removed using a suitable acid such, for example, as trifluoroacetic acid or dichloroacetic acid in an inert solvent such, for example, as dichloromethane or toluene, to leave a free 5'-terminal hydroxyl group for chain extension.

After masking the surface at the selected ones of the first plurality of functionalised sites, the temperature of the surface may be lowered and a suitable nucleosidic chain extender, usually comprising a single type of nucleobase, is deposited on the surface under reaction conditions suitable for causing or allowing the reaction to proceed at the non-selected, unmasked sites.

In the phosphoramidite method, the nucleosidic chain extender may comprise a single nucleoside phosphoramidite comprising a first 3'-terminal phosphoramidite group such, for example, as N,N-diisopropyl phosphoramidite and a second protected 5'-terminal hydroxyl group, but it will be appreciated that the chain extender may comprise a different 3'-terminal phosphate group or suitable derivative thereof. In other embodiments, where the molecular precursor comprises a 5'-terminal phosphate or a derivative thereof, the chain extender may comprise a first 3'-terminal hydroxyl group or a suitable derivative thereof.

To prevent undesired side reactions, all other functional groups present in the molecular precursor and chain extender should be rendered unreactive (protected) by attaching suitable protecting groups. Upon completion of the oligonucleotide chain assembly as described below, all the protecting groups may be removed to yield the desired oligonucleotides.

The nucleoside phosphoramidite may be deposited on the surface in solution together with a suitable catalyst for activating the phosphoramidite. For instance, in some embodiments, the nucleoside phosphoramidite may be provided in solution in acetonitrile, preferably anhydrous acetonitrile. Said solution may have a concentration in the range of about 0.02-0.2 M. The concentration of the phosphoramidite should be sufficient to afford approximately a 1.5-20-fold excess over the support-bound molecular precursor.

Various suitable catalysts are known to those skilled in the art, including an acidic azole catalyst, 1H-tetrazole, 2-ethylthiotetrazole, 2-benzylthiotetrazole and 4,5-dicyanoimidazole. The catalyst may be provided in an approximately 0.2-0.7 M solution in acetonitrile. Suitably, the catalyst solution maybe mixed with the nucleoside phosphoramidite solution prior to deposition onto the surface.

The 5'-hydroxy group on the molecular precursor reacts with the activated phosphoramidite moiety of the incoming nucleoside phosphoramidite to form a phosphite triester linkage. The phosphoramidite coupling is very rapid and requires, on a small scale, about 20 seconds for its completion. Upon completion of the coupling, any unreacted chain extender and by-products may be removed by washing, e.g., in acetonitrile.

Thereafter, capping and oxidation steps as known in the art may be carried out. Capping to block permanently any unreacted molecular precursor at the unmasked sites may be performed using any suitable capping agent such, for example, as a mixture of acetic anhydride and 1-methylimidazole or DMAP, which may also serve to remove any unwanted guanosine $O^6$ modifications where 1H-tetrazole catalyst is used. Oxidation to convert the newly formed phosphite triester linkage to the naturally occurring phosphate diester internucleosidic linkage may be carried out using any suitable oxidising agent such, for example, as iodine and water in the presence of a weak base such, for example, as pyridine, lutidine or collidine.

It should be noted that in some embodiments, the molecular chain extender solution and other reagents may be co-soluble with the masking material, e.g., icosane. However, if the eutectic freezing point of the masking material and the extender reagent mixture is above the reaction temperature (which is generally true for nucleosides at room temperature) then the masking layer will remain impermeable owing to its high density (void free) solid phase.

After completion of step (4) it will be appreciated that the molecular precursors at the non-selected (unmasked) of the first plurality of functionalised sites have been extended by one chain extender residue, for example one nucleotide residue, with the same extender being added at each of the unmasked sites.

Thereafter, the masking material in the third phase may be removed entirely from the surface by dissolving the masking material in a suitable solvent therefor, as described above, and steps (2-1)(ii) to (4), or steps (2-2)(i) to (4), may be repeated for one or more further cycles using the same or, preferably, a different chain extender such, for example, as a nucleosidic extender comprising a different nucleobase, and re-masking the surface in accordance with the method of the second aspect of the invention, such that at least some of the previously masked sites remain unmasked.

As described above, where all of the molecular precursors at the first plurality of functionalised sites are de-protected in the first cycle prior to masking, no further de-protecting step (2-1)(i) is required during the same round of chain extension until reactions been carried out at all of the first plurality of functionalised sites, and accordingly step (2-1)(i) can be omitted for the second and subsequent cycles within the same round. However, where the de-protection step (2-2)(ii) is carried out after the masking step (2-2)(i) in the first cycle, it will be necessary to de-protect the molecular precursors at the newly unmasked sites during each cycle, and accordingly it is also necessary in step (2-2)(i) of the second and subsequent cycles of the same round to mask the previously unmasked sites, so as to prevent further reaction at the sites until the next round, if any.

Thus, in some embodiments, the method of the third aspect of the invention may further comprise:

(5-1) removing the masking material from the surface by dissolving the masking material in a suitable solvent therefor; and (6-1) repeating steps (2-1)(ii)-(4),or (2-2)(i)-(4), using the same or a different molecular chain extender, and re-masking the surface such that at least some of the previously masked sites remain unmasked.

It will be understood that steps (5-1) and (6-1) may be repeated for a plurality of cycles, each time re-masking the surface such that a smaller sub-set of the sites previously masked in all earlier cycles remain masked. The method of the third aspect of the invention may be repeated until the molecular precursors at all of the first plurality of functionalised sites have been incrementally extended by one extender residue, e.g. one nucleotide or amino acid residue. Typically for oligonucleotide synthesis as described above, this would involve four cycles—one for each of the four different nucleosides—, but more cycles may be needed if synthetic nucleoside derivatives or non-nucleoside phosphoramidites were also used. For peptide synthesis as described in more detail below, this would typically involve 22 cycles—one for each of the 22 different standard amino acids—, but more cycles may be needed if non-standard amino acids are also used. Within each cycle, the unmasked sites are reacted with the same chain extender, and by controlling within each cycle which sites are masked and which are unmasked, different predetermined polymeric molecules can be incrementally synthesised at each site.

In an alternative embodiment, instead of removing all of the masking material from the surface in step (5-1) after each cycle, the masking material in the second (or third phase) may be removed selectively from one or more selected ones of the previously masked sites as described above in connection with the second aspect of the invention, and the newly unmasked sites then treated with a different chain extender. In embodiments where all of the molecular precursors are de-protected in the first cycle in step (2-1)(i), the molecular precursors at the newly unmasked sites will already be de-protected, and so no further de-protection step is required. However, in embodiments where the molecular precursors are de-protected only at the non-selected unmasked sites in step (2-2)(ii) after masking the selected sites in step (2-2)(i), then it will be appreciated that before treatment with the different chain extender, the molecular precursors at the newly unmasked sites must be de-protected using a suitable de-protecting agent before they can be extended, and accordingly it will also be necessary to mask the previously unmasked sites to ensure the second protected reactive groups on the newly added chain extender residues at those sites are not de-protected.

Thus, in some embodiments the method of the third aspect of the invention may further comprise removing the masking material from one or more selected ones of the sites previously masked in step (2-1)(ii) or (2-2)(i) by:

(5-2) where step (2-2)(ii) is carried out, masking the previously unmasked sites, or (5-2') where step (2-1)(i) is carried out, optionally masking the previously unmasked sites;

(6-2) either depositing an organic co-solvent on the surface while maintaining the surface at a temperature at or near to the freezing point of the co-solvent; and (7-2) applying energy at one or more selected ones of the previously masked sites to melt the masking material, whereby the masking material is dissolved by the co-solvent at the selected sites to yield one or more different unmasked sites; or (6-2') or depositing a polar fluid on the surface; and (7-2') applying energy at one or more selected ones of the previously masked sites to melt the masking material, whereby the masking material is displaced from the surface by the polar fluid to yield one or more different unmasked sites; and (8-2) where step (2-2)(ii) is carried out, de-protecting the terminal reactive groups on the precursors at the one or more different unmasked sites; and (9-2) thereafter repeating steps (3) and (4) using the same or a different molecular chain extender at said one or more different unmasked sites.

It will be appreciated that step (5-2) or (5-2') may be carried out before or after steps (6-2) and (7-2) or (6-2') and (7-2'), but step (5-2) should be performed before step (8-2).

Steps (6-2) and (7-2) correspond respectively to steps (f-1) and (g-1), and steps (6-2') and (7-2') correspond respectively to steps (f-2) and (g-2), of the method of the second aspect of the present invention, for which further details are given above and need not be repeated here.

In steps (5-2) and (5-2'), the previously unmasked sites can be selectively masked by:

(10-2) depositing masking material in said first removable phase on the surface to cover at least said previously unmasked sites;

(11-2) applying thermal energy to the masking material at least at said unmasked sites to cause or allow the masking material to undergo a first localised phase change to said second surface wetting phase at least at said unmasked sites; and (12-2) removing the remainder of the masking material in the first phase from the surface.

Steps (10-2), (11-2) and (12-2) correspond respectively to steps (h), (i) and (j) of the method of the second aspect of the invention and need not be described again in more detail here. As in step (c) of the method of the second aspect of the invention, the second phase of the masking material produced in step (11-2) may be sufficiently well adhered to the surface and non-porous to serve as a mask at the previously unmasked sites. However in some embodiments, the masking material at the previously unmasked sites may require further annealing in a manner similar to step (e) of the second aspect of the invention as described above.

Thus in some embodiments the method may further comprise:

(13-2) after step (12-2) treating the masking material at least at the previously unmasked sites to undergo a second further phase change to said third non-porous phase that serves to mask the previously unmasked sites.

As with the steps (5-1) and (6-1), steps (5-2) or (5-2') to (13-2) may be repeated for a plurality of cycles, each time un-masking one or more selected sites on the surface that are masked in all previous cycles and extending the molecular precursors at those selected sites using a different molecular chain extender.

Once the molecular precursors at all of the first plurality of sites have been extended by one residue, the method of the third aspect of the invention may be repeated for one or more further rounds, so that the molecular precursors at each of the first plurality of sites are incrementally extended by one or more further residues of chain extender, with each successive chain extender residue being attached to the second reactive group of the chain extender residue added in the immediately preceding round. Within each cycle, the non-selected unmasked sites are incrementally extended by the same chain extender residue, and within each round, all of the first plurality of functionalised sites are incrementally extended by one extender residue. Within each round after the first, the de-protecting step involves de-protecting the second protected reactive group on the chain extender residue added at each functionalised sites during the immediately preceding round.

As indicated above, the method of the third aspect of the invention may be repeated by up to 25, 50, 75, 100 or even 200 rounds, for example to produce peptides of up to 75 or 100 amino acid residues or oligonucleotides of up to 200 nucleotide residues in length.

In a variant of the method of the third aspect of the present invention, all of the first plurality of functionalised sites may be initially masked in the first cycle of each round, and then one or more sites selectively un-masked in accordance with the invention for incremental chain extension.

In some embodiments, the terminal reactive groups on the molecular precursors at all of the first plurality of functionalised sites may be de-protected prior to masking, in which case the second and subsequent cycles, if required, may proceed simply by un-masking further selected ones of the previously masked sites. Alternatively, the terminal reactive groups on the molecular precursors may be de-protected after un-masking the selected one or more sites, in which case within each cycle, the previously unmasked sites must be re-masked before the de-protecting step in order to preserve the protecting groups on the second reactive groups on the newly added chain extender residues at those sites.

Thus, in accordance with a variant of the third aspect of the present invention there is provided a method of synthesising an array of molecules, said method comprising the steps of:

(i) providing a surface defining an array of functionalised sites, wherein each site comprises a heating element, and the surface is derivatised at a first plurality of said sites with a surface-bound molecular precursor having a protected free terminal reactive group;

(ii) optionally de-protecting the terminal reactive groups on the precursors at the first plurality of functionalised sites;

(iii) masking the first plurality of sites with a non-porous layer of an organic masking material;

(iv-1) either depositing an organic co-solvent for the masking material on the surface while maintaining the surface at a temperature near to the freezing point of the co-solvent; and (v-1) applying thermal energy at one or more selected ones of the first plurality of sites to cause or allow localised melting of the coating of masking material at said selected sites, whereby the coating of masking material is dissolved by the co-solvent to unmask only said selected sites;

(iv-2) or depositing a polar fluid on the surface; and (v-2) applying thermal energy at one or more selected ones of the first plurality of sites to cause or allow localised melting of the coating of masking material at said selected sites, whereby the masking material is displaced from the surface by the polar fluid to unmask only said selected sites; and (vi) if step (ii) is not performed, de-protecting the terminal reactive groups on the precursors at the unmasked sites;

(vii) depositing on the surface a molecular chain extender having a first unprotected reactive group that is capable of reacting with the free terminal reactive group on the precursor for joining the chain extender to the precursor, and a second protected reactive group, under reaction conditions suitable for causing or allowing said reaction to proceed at the unmasked sites;

(vii) removing unreacted chain extender.

In accordance with the method of the variant of the third aspect of the invention, the functionalised sites, molecular precursors, molecular chain extenders, masking material and co-solvents, and the methods of masking and selectively unmasking the functionalised sites may be the same as described with reference to the methods of the second and third aspects of the invention and need not be described in more detail here.

In some embodiments, in step (iii) the masking material may be applied to the surface in accordance with the second aspect of the invention described above. Thus, the masking material may be deposited on the surface in a first removable phase such, for example, as a particulate phase, e.g. nanoparticles, and thermal energy applied to the masking material at one or more selected sites to cause or allow the masking material to undergo a first localised phase change to a second surface wetting phase. The details of this are described above and need not be described again here.

However, in other embodiments, it may be unnecessary to apply the masking material to the surface in particulate form, and instead in step (iii) the masking material may be deposited on the surface directly in the form of a non-porous coating, for example by spin coating.

Those skilled in the art will appreciate that after completing steps (i) to (vii) of the first cycle, all of the masking material may be removed from the surface and steps (iii) to (vii) may be repeated for one or more cycles, using the same or different molecular chain extenders for each cycle, and exposing different sites on the surface in each cycle until each of the first plurality of sites has been extended by one chain extender residue.

Alternatively, for the second and subsequent cycles, if required, further sites may be selectively unmasked by repeating steps (iv-1) and (v-1) or (iv-2) or (v-2) without removing all of the masking material from the surface. If step (ii) is performed, there is no need to re-mask the previously unmasked sites, although this can be done if desired. If step (ii) is not performed, then in each cycle the previously unmasked sites should be re-masked, and the molecular precursors at the newly unmasked sites de-protected in accordance with step (vi).

The re-masking step may be carried out by:

(viii) depositing masking material in said first removable phase on the surface to cover at least said previously unmasked sites;

(ix) applying thermal energy to the masking material at least at said previously unmasked sites to cause or allow the masking material to undergo a first localised phase change to said second surface wetting phase at least at said previously unmasked sites; and (x) removing the remainder of the masking material in the first phase from the surface.

Steps (viii), (ix) and (x) may be carried out before step (iv-1) or (iv-2) or after step (v-1) or (v-2), and must be performed before step (vi). Steps (viii), (ix) and (x) correspond respectively to steps (h), (i) and (j) of the method of the second aspect of the invention and need not be described again in detail here. As in step (c) of the method of the second aspect of the invention, the second phase of the masking material produced in step (ix) may be sufficiently well adhered to the surface and non-porous to serve as a mask at the previously unmasked sites. However in some embodiments, the masking material at the previously unmasked sites may require further annealing in a manner similar to step (e) of the second aspect of the invention as described above.

As before, steps (iii) to (vii), including steps (viii)-(x) where they are carried out, may be repeated for a plurality of successive cycles, each time using a different chain extender until all of the first plurality of functionalised sites on the surface have been extended by one chain extender residue. Thereafter, all of the masking material may be removed from the surface and steps (ii) to (vii), including steps (viii)-(x) where they are carried out, repeated for one or more further rounds, each round comprising a plurality of cycles as described above.

In some embodiments, the method of the third aspect of the invention, including its variant, may be particularly used for solid-phase peptide synthesis (SPPS). Essentially, peptide synthesis in accordance with the invention follows the same general methods as described above with reference to oligonucleotide synthesis, but substituting amino acid-based chain extenders for the nuclear acidic chain extenders used in oligonucleotide synthesis.

Thus, surface may be functionalised at each of the functionalised sites with an attachment agent having a free terminal functional group such, for example, as an amino group or carboxyl that serves as the molecular precursor.

Alternatively, the molecular precursor may comprise a separate linker that is bonded to the attachment agent and has a free terminal reactive group, suitably an amino or carboxyl group. Numerous linkers for use in solid-phase peptide synthesis are known to those skilled in the art including, for example, the Rink linker which is acid labile. In some embodiments, it may be desirable to remove the peptide from the surface after molecular assembly, but in other embodiments it may be desirable for the peptide to be permanently attached using, for example, a non-labile linker.

The linker may comprise, for example, a single amino acid that is bonded to the attachment agent. Alternatively, the molecular precursor may comprise a short peptide tag of several (for example 2-10) amino acids that is bonded to the attachment agent.

In other embodiments, the molecular precursor may comprise a suitable linker that attached to the surface and a single amino acid or short peptide tag that is attached to the linker. As mentioned above, where the precursor comprises a single amino acid or a short peptide tag, all of the first functionalised sites may comprise the same amino acid which may serve as a common tag.

Various different methods for solid-state oligonucleotide synthesis are known to those skilled in the art. These methods are well known to those skilled in the art and need not be described in detail herein. Typically solid-state synthesis of peptides proceeds in the C- to N-direction, and suitably said precursor may therefore comprise a protected terminal amino group. However, the present invention is not limited to any specific technique for peptide synthesis, and in other embodiments, it is envisaged, for example, that the precursor may comprise a protected terminal carboxyl group, such that peptide synthesis may proceed in the N- to C-direction.

Various suitable amino protecting groups for use in SPPS are known in the art and may be used in accordance with the present invention. However, at the time of writing two protecting groups are commonly used: tert-butyloxycarbonyl (t-Boc) and 9-fluorenylmethyloxycarbonyl (Fmoc). Their lability is caused by the carbamate group which readily releases carbon dioxide for an irreversible decoupling step.

The t-Boc group may be covalently bound to the terminal amino group to suppress its nucleophilicity. In steps (2-1)(i) or (2-2)(ii), the protecting group may be removed using a suitable acid such, for example, as trifluoroacetic acid (TFA). For instance, in some embodiments, 10% trifluoroacetic acid in dichloromethane may be used. This forms a positively-charged terminal amino group which is neutralised and may be coupled to an activating amino acid as the molecular chain extender. t-Boc is especially useful when synthesising non-natural peptide analogues which are base-sensitive.

As compared with t-Boc, Fmoc uses a milder de-protection scheme, using a base. In steps (2-1)(i) or (2-2)(ii) therefore a suitable base may be used to de-protect the terminal reactive amino group on the molecular precursor. For this, pyridine may be used, for example, piperidine (20-50%) as known in the art.

After masking the surface at the selected ones of the first plurality of functionalised sites, the temperature of the service may be lowered and a suitable amino acid chain extender, usually comprising a single amino acid residue, may be deposited on the surface under reaction conditions suitable for causing or allowing the reaction to proceed at the unmasked sites. Suitably, said amino acid chain extender may be applied to the surface in a solvent that is not compatible with the masking material (e.g., tetracosane) so the masking material is not dissolved. For instance, the amino acid chain extender may be dissolved in acetonitrile, propylene carbonate or ethylene carbonate.

Where peptide synthesis proceeds in the C- to N-direction, the amino acid chain extender may comprise a protected amino group and an unprotected carboxyl group. For coupling the peptides, the carboxyl group on the chain extender is usually activated. This may be important for speeding up the reaction. Any suitable activating group known to those skilled in the art may be used, but at the time of writing there are two main types.

In some embodiments, a carbodiimide activating group may be used. Said carbodiimide may be selected from dicyclohexylcarbodiimide (DCC) or diisopropylcarbodiimide (DIC). Reaction with a carboxylic acid yields a highly reactive O-acylisourea.

Alternatively, a triazolol activating group may be used. Said triazolol may be selected from 1-hydroxy-benzotriazole (HOBt) or 1-hydroxy-7-aza-benzotriazole (HOAt). Others have been developed such, for example, as ethyl-2-cyano-2-(hydroxyimino)acetate. HOAt is especially favourable because of a neighbouring group effect.

In yet another alternative, the active ester may be introduced as a uronium or phosphonium salt of a non-nucleophilic anion.

To prevent undesired side reactions, all other functional groups present in the molecular precursor and chain extender should be rendered unreactive (protected) by attaching suitable protecting groups. Upon completion of the peptide chain assembly, all the protecting groups may be removed to yield the desired peptide. Various side-chain protecting groups are known in the art. Semi-permanent side-chain protecting groups are usually t-butyl based, and their removal after completion of the peptide chain assembly may be accomplished using an acid such as trifluoroacetic acid. Other known side-chain protecting groups include the benzyloxy-carbonyl (Z) group and the allyloxycarbonyl (alloc) protecting group.

Amino acid side chains represent a broad range of functional groups and are sites of non-specific reactivity during peptide synthesis. Because of this, many different protecting groups are required that are usually based on the benzyl (Bzl) or tert-butyl (tBu) group. The specific protecting groups used during the synthesis of a given peptide vary depending on the peptide sequence and the type of N-terminal protection used. Side-chain protecting groups are known as permanent or semi-permanent protecting groups, because they can withstand the multiple cycles of chemical treatment during synthesis and are only removed during treatment with strong acid after peptide synthesis is complete.

Because multiple protecting groups are normally used during peptide synthesis, these groups must be compatible to allow de-protection of distinct protecting groups while not affecting other protecting groups. Protecting schemes are therefore established to match protecting groups so that de-protection of one protecting group does not affect the binding of the other groups. Because N-terminal de-protection occurs continuously during peptide synthesis, protecting schemes have been established in which the different types of side-chain protecting groups (Bzl or tBu) are matched to either Boc or Fmoc, respectively for optimised de protection.

After step (3), the surface may be washed in step (4) using a suitable washing reagent such, for example, as N,N-dimethylformamide (DMF) to remove excess reagents during each cycle.

Within each cycle therefore the molecular precursors at unmasked sites are extended by one amino acid residue, usually in the C- to N-direction, with the same amino acid residue being added at each of the unmasked sites. Thereafter, additional cycles may be performed as described above, by removing all of the masking material from the surface and re-masking the surface to leave unmasked different selected ones of functionalised sites, or by selectively unmasking one or more further sites, and performing additional de-protecting steps as required. Once all of the first plurality of functionalised sites have been extended by one amino acid residue, the entire process may be repeated for one or more further rounds, so that the molecular precursors at each of the functionalised sites is progressively extended one amino acid at a time.

Using methods are similar to those described above for oligonucleotide and peptide synthesis, the methods of the present invention may also be used for incremental oligosaccharide synthesis or Click chemistry. The application of the methods of the present invention to these alternative methods of molecular assembly will be self-evident to those skilled in the art from the above and need not be described in detail herein.

For oligosaccharide synthesis, each molecular chain extender suitably comprises one or more saccharide residues, typically a monosaccharide residue, with a first unprotected reactive group that is capable of reacting with the free terminal reactive group on the molecular precursor attached to the surface and a second protected reactive group which can be de-protected for second and subsequent rounds of molecular assembly.

In some embodiments of the first aspect of the invention, the masking material may be applied to the surface in a non-porous high density phase, and the applied energy brings about a phase change in the masking material at the selected sites such that it can be removed from the surface for unmasking the selected sites.

According to a fourth aspect of the present invention therefore there is provided a method of selectively unmasking one or more sites on a surface, said method comprising the steps of:

(A) providing a surface defining an array of sites, wherein each site comprises a heating element;

(B) masking a plurality of the sites with a non-porous layer of an organic masking material;

(C-1) either depositing an organic co-solvent for the masking material on the surface while maintaining the surface at a temperature near to the freezing point of the co-solvent; and (D-1) applying thermal energy at one or more selected ones of the plurality of sites to cause or allow localised melting of the coating of masking material at said selected sites, whereby the coating of masking material is dissolved by the co-solvent to unmask only said selected sites;

(C-2) or depositing a polar fluid on the surface; and (D-2) applying thermal energy at one or more selected ones of the plurality of sites to cause or allow localised melting of the coating of masking material at the selected sites, whereby the masking material is displaced from the surface by the polar fluid to unmask only said selected sites.

In some embodiments all of the sites on the surface may initially be masked by the masking material.

As described above, the localised melting of the masking material at the selected masked sites causes a localised phase change. Melting of the non-porous masking material causes expansion of the masking material with a concomitant increase in molecular disorder and reduction in packing density, resulting in a degree of porosity. The polar fluid is immiscible with the masking layer, but the porosity of the melted masking material allows the polar fluid to displace the masking material from the surface at the selected masked sites, since the surface has a greater affinity for the polar fluid than it has for the masking material. In this way the masking material can be selectively removed from the selected sites.

Suitable polar fluids are described above.

In addition to the methods of masking or unmasking one or more sites on a surface and the methods of synthesising arrays of molecules in accordance with the first, second, third and fourth aspects of the invention as described above, the present invention also comprehends apparatus and equipment for use in the methods of the invention.

In a fifth aspect of the invention therefore there is provided apparatus for selectively masking one or more sites on a surface, said apparatus comprising:

a substrate having a surface defining an array of addressable sites, with a heating element at each site;

a selectively operable dispenser for dispensing a layer of a masking material onto the surface to cover a plurality of the sites;

a heating controller for selectively applying transient thermal energy at each site through the respective heating element; and a computer and corresponding interfaces for controlling operation of the heating controller and the dispenser.

The substrate has been described above in relation to the second aspect of the invention and need not be described again in detail here.

As described above, in some embodiments, the substrate may comprise an optically transparent substrate, for instance an optically transparent slide which may be made from glass, or another form of fused silica, or from sapphire. Each heating element may comprise a metal plate or wafer, suitably selected from gold, platinum, chromium, tantalum, copper or aluminium. Said heating controller may comprise a scanning laser for transmitting energy to the metal plate one or more selected sites. Suitably an ultraviolet or blue light laser having a wavelength of about 355 nm or 405 nm may be used; for example a Q-switched pulsed UV laser. The beam may be directed at the metal plate or wafer through a reverse face of the substrate. It will be understood therefore that the substrate should at least be optically transparent to the wavelength of the electromagnetic radiation.

Alternatively, the substrate may comprise a silicon chip, and each heating element may comprise a micro-heater formed in or on the silicon chip at the respective site. Said heating controller may comprise one or more control logic elements as described above for controlling operation of the micro-heater at each site in accordance with instructions received from the computer.

According to a sixth aspect of the invention there is provided a substrate for molecular assembly, said substrate having a surface defining an array of sites at a spacing of less than 10 µm, typically less than 5 µm, with a heating element at each site.

The substrate has been described above in relation to the second aspect of the invention and need not be described again in detail here.

Advantageously, each site may be functionalised and derivatised by a surface-bound molecular precursor having a protected free terminal reactive group. Again, suitable molecular precursors have been described in detail above and need not be described again detail here.

In some embodiments, each site may comprise one or more beads adhered to said surface as described above, and said precursor may be bound to said beads. Each bead may have a diameter of less than 5 µm, typically 0.5-2 µm, e.g. about 1 µm.

According to a seventh aspect of the present invention there is provided a semiconductor chip comprising a plurality of microheaters for modulating a masking layer at selected areas of the chip surface based on data delivered to the chip to create a data dependant auto-masking pattern of masked and un-masked sites at the surface of the chip.

A described above the masking layer may be initially deposited on the surface of the chip as a porous layer and then selectively melted by the microheaters according to the data delivered to the chip to form a pattern of porous and selectively melted non-porous masked sites. The masking layer may be deposited as a layer of nanoparticles.

Alternatively the masking layer may be placed under a layer of a polar fluid, e.g. acetonitrile, propylene carbonate or water, as described above, wherein sites on the masking layer are then selectively melted by the microheaters according to the data delivered to the chip, thereby allowing the polar fluid to penetrate and displace the masking layer at the chip surface, thus forming a data dependant pattern of masked and un-masked areas on the surface of the chip.

According to a eighth aspect of the invention there is provided molecular microarray comprising a substrate having a surface defining an array of functionalised sites, a heating element at each site, and a library of surface bound molecules attached to the surface at the sites; wherein the spacing between the sites is less than 10 µm, typically less than 5 µm.

In some embodiments said molecules may comprise oligonucleotides, peptides, polysaccharides or Click chemistry molecules, synthesised in accordance with the Following is a description by way of example only with reference to the accompanying drawings of embodiments of the present invention.

In the drawings:

FIG. 11A is a drawing of a photomicrograph of the surface of a silicon chip in accordance with the invention with a strip of gold on the surface that serves as a microheater.

FIG. 11B is a drawing of a photomicrograph of the surface of a silicon chip that is similar to the one shown in FIG. 11A in which the strip of gold on the surface has been etched away with potassium iodide.

FIG. 12A is a drawing of a photomicrograph of the surface of another silicon chip in accordance with the invention with two strips of gold on the surface that serve as microheaters.

FIG. 12B is a drawing of a photomicrograph of the surface of a silicon chip that is similar to the one shown in FIG. 12A in which the strips of gold on the surface have been etched away.

FIG. 1(a) shows schematically a substrate 10 for molecular assembly in accordance with a first embodiment of the present invention. The substrate 10 according to the present embodiment is adapted as described below for use in oligonucleotide synthesis.

The substrate 10 comprises a sheet of glass having an obverse face 12 and a reverse face 14. The thickness of the sheet between the front and rear faces is about 200 µm. The sheet may have any convenient shape, but is suitably rectangular having dimensions of about 20 mm by 20 mm. The sheet is transparent to electromagnetic radiation, particularly light having a wavelength of about 355 nm or 405 nm. Whilst the substrate in the present embodiment is made of glass, any other suitable, optically transparent material may be used, for instance another form of fused silica, or sapphire.

Figure 1A:
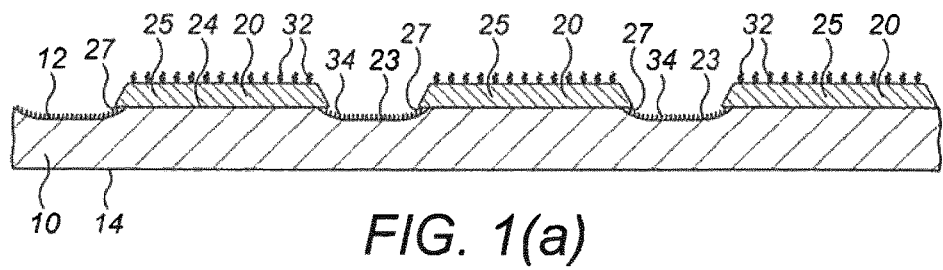
FIG. 1(a) is a schematic sectional view through a substrate according to a first embodiment of the invention having a surface defining an array of functionalised sites, each of which comprises a heating element and is derivatised with a linker molecule for solid phase oligonucleotide synthesis.

The obverse face 12 is patterned as shown in FIG. 1(a) to define a multitude of sites 20. In FIG. 1(a) only three sites 20 are shown for the purposes of illustration, but suitably the obverse face 12 of the substrate 10 may comprise up to 1,000,000 sites 20, with a spacing of about 4-5 µm. It will be seen from FIG. 1(a) that intermediate the sites 20, the obverse face 12 of the substrate 10 is etched away to form a shallow hollow 23, such that at the sites 20 the obverse face stands proud of the surface to form a substantially flat-topped mesa or raised portion 24.

Figure 2:
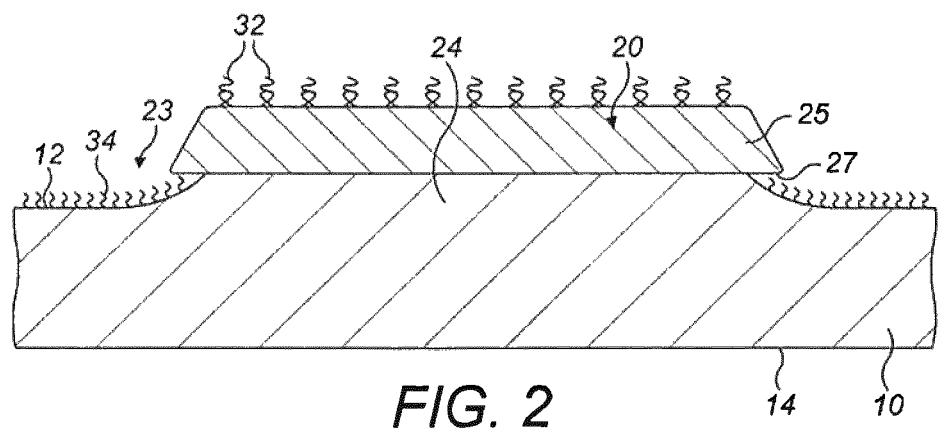
FIG. 2 is an enlarged view of one of the functionalised sites of the substrate of FIG. 1(a).

FIG. 2 shows a single site 20 for clarity. At each site 20, the surface carries a small metal disc 25, which serves as a heating element as described in more detail below. The metal disc 25 may have a thickness of about 200 nm. It may be circular having a diameter of about 2 µm. However, in other embodiments, the thickness may vary in the range of about 50-500 nm, and the dimension of the metal disc in the plane of the obverse face 12 may range from about 1-5 µm. In the present embodiment, the discs 25 are generally circular, but in other embodiments, they may have other shapes as desired. As will be seen from FIG. 2 the disc 25 is slightly larger than the raised mesa on the obverse face 12 of the substrate 10, such that the disk 25 slightly overhangs the edge of the mesa on which it is attached to form a peripheral undercut region 27. This is advantageous for the reasons described below.

Suitably, the metal discs 25 may be made of gold, but in other embodiments, another metal such as platinum, chromium, tantalum, copper or aluminium may be used, or another conductive material. The 25 discs may be applied to the surface with a thickness of about 10 µm and then ablated to the desired thickness.

Each of the metal discs 25 is coated with an attachment agent for anchoring molecular precursors 32 of the kind described below for molecular assembly to the surface. In the present embodiment, each metal disk 25 is treated with an amino alkylthiol, e.g., aminopropylthiol which bonds to the gold surface, leaving a free terminal amino group. Alkylthiols are well known in the art for the attachment of molecules to gold surfaces, and numerous suitable alternative materials are also known.

In this way, each of the metal discs 25 is functionalised with the attachment agent. The attachment agent may be used to attach a wide variety of different molecular precursors 32 to the surface. In the present embodiment, the attachment agent is used to attach a nucleosidic or non-nucleosidic linker 32 of the kind known in the art. For instance, in the present embodiment, the free terminal amino groups of the attachment agent may be bonded to the 3'-hydroxyl group of a nucleoside residue via a 3'-O-succinyl arm:

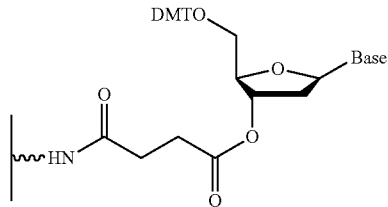

The linker 32 has a protected terminal reactive group, and in the present embodiment the nucleosidic linker comprises a protected 5'-hydroxyl group. A wide variety of suitable protecting groups are known to those skilled in the art and may be selected according to the nature of the terminal reactive group. In the present embodiment, 4,4'-dimethoxytrityl (DMT) is used. DMT is a well-known protecting group for use in incremental oligonucleotide synthesis.

In this way, each of the sites 20 is derivatised with a molecular precursor such, for example, as a linker 32 of the kind described above.

Intermediate the sites 20, the obverse face 12 is treated in the hollows 23 with a low energy surface coating 34 such, for example, as a fluorocarbon, which is hydrophobic and lipophobic. In the present embodiment, the obverse face 12 of the substrate 10 is coated between the sites 20 with a perfluoroalkylsilane such, for example, as trichloro-fluoroalkylsilane which bonds covalently to the glass surface through the silane moiety.

Figure 3:
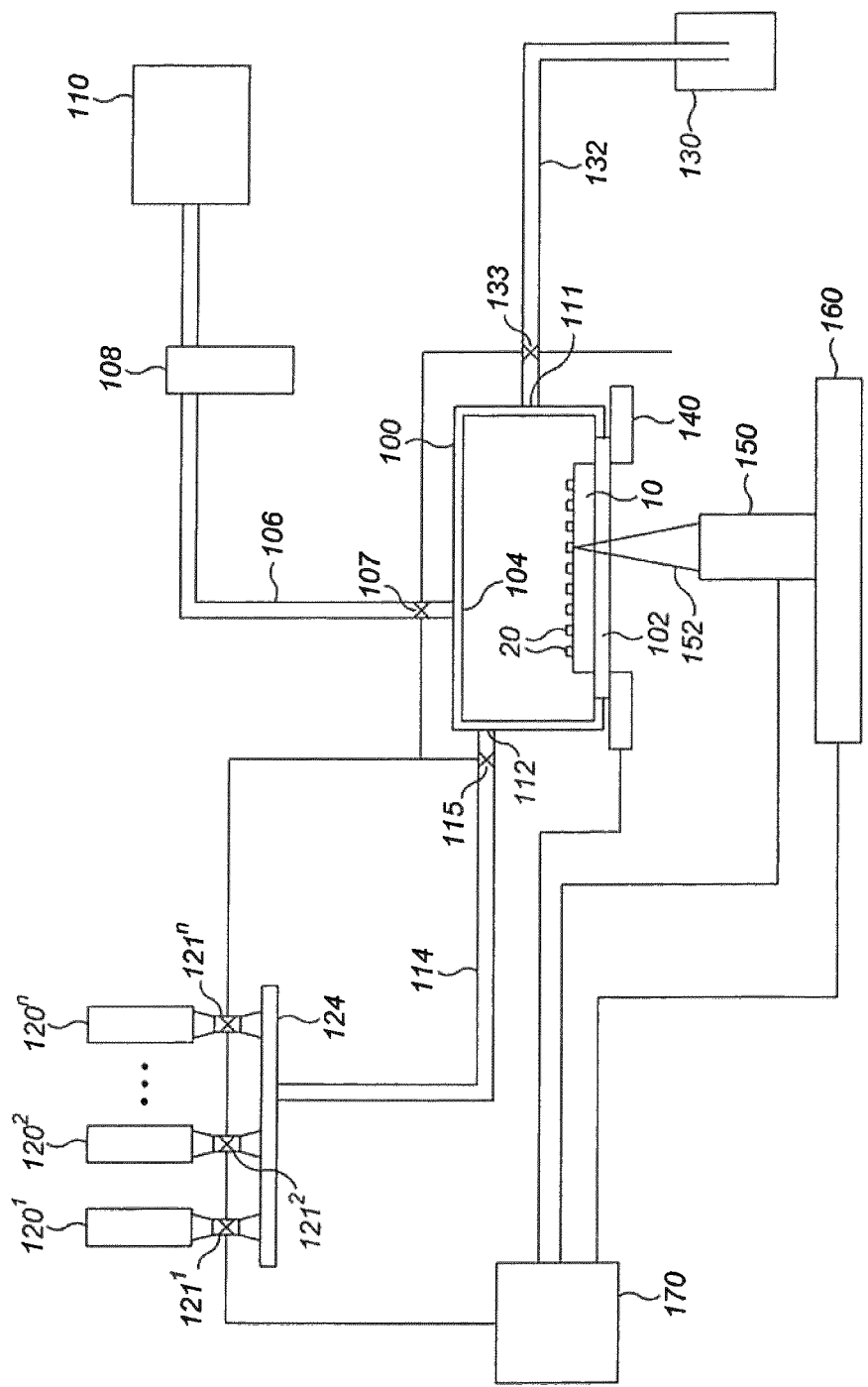
FIG. 3 shows schematically a general arrangement of equipment for performing molecular assembly using the substrate of FIG. 1(a) in accordance with a second embodiment of the the invention.

FIG. 3 shows schematically apparatus for molecular assembly, in particular oligonucleotide synthesis, according to a second embodiment of the invention and using the substrate 10 of the invention as described above.

At its most general level, incremental oligonucleotide synthesis may be performed at each of the sites 20 on the obverse face 12 of the substrate 10. A number of rounds of synthesis are performed, and within each round, the molecular precursors at each of the sites 20 are extended by a single nucleotide residue. Within each round, a number of cycles are carried out, each cycle using a different nucleosidic chain extender such, for example, as a nucleoside phosphoramidite, and each round comprises a sufficient number of cycles that the molecular precursors at all of the sites 20 are extended by one residue. Typically, each round comprises four cycles—one for each of the four basic nucleotide residues—but more cycles may be employed where non-standard nucleotides are included in the oligonucleotide chains.

Within each cycle, selected sites 20 are temporarily masked with a layer of a waxy, non-polar organic substance as a masking material such, for example, as tetracosane, as described below, so that the selected masked sites 20 are inaccessible to extrinsic reagents added to the substrate 10 for oligonucleotide synthesis, while the non-selected sites 20 are accessible to such reagents. Within each cycle therefore oligonucleotide synthesis with a given nucleosidic chain extender occurs at the non-selected sites, but not at the selected sites. The cycles are repeated, so that within each cycle different ones of the sites 20 are extended using a different nucleosidic chain extender. The masking of the selected sites 20 is carried out under computer control, so that different predetermined oligonucleotides can be rapidly synthesised at each of the sites 20 to form an array comprising a library of different oligonucleotides. Sufficient rounds of synthesis are carried out to "grow" the oligonucleotides at each of the sites 20 to the desired length. It will be appreciated from the above description of the substrate 10 that the final array may comprise up to 1,000,000 different oligonucleotides attached to the substrate 10 at the sites 20.

As seen in FIG. 3, the substrate 10, with the functionalised and derivatised sites 20, is mounted on a transparent window 102 of a flow cell 100. Suitably, the transparent window 102 may be made of sapphire, for example. The flow cell 100 comprises a first outlet 104 that is connected via a vacuum line 106, including a selectively operable valve 107 and a solvent trap 108, to a vacuum pump 110 for controlling the pressure within the flow cell 100 in the range 1 mbar to 1 bar under an inert atmosphere, which may comprise, for example, nitrogen or argon.

The flow cell 100 further comprises an inlet 112 that is connected via an inlet conduit 114, with a selectively operable valve 115, to one or more reagent and/or solvent dispensers $120^{1-n}$, each of which has its own respective selectively operable valve $121^{1-n}$ and feeds into a mixing manifold 124 that supplies the inlet conduit 114.

In the present embodiment, a first one of the dispensers $120^1$ contains a solution of about 3% trichloroacetic acid in dichloromethane.

A second one of the dispensers $120^2$ contains a dispersion of tetracosane nanoparticles in acetonitrile. The nanoparticles have a diameter of about 30 nm, and the dispersion contains about 10% solids. The tetracosane serves as the masking material for the substrate at the selected sites 20. While tetracosane is used in the present embodiment, other alternative masked materials may be used as described above including, for example, eicosane or a mixture of two or more higher n-alkanes.

A third one of the dispensers $120^3$ contains acetonitrile.

A fourth one of the dispensers $120^4$ contains pentane.

A fifth one of the dispensers $120^5$ comprises a catalyst for oligonucleotide synthesis of the kind known to those skilled in the art such, for example, as an acidic azole catalyst, 1H-tetrazole, 2-ethylthiotetrazole, 2-benzylthiotetrazole or 4,5-dicyanoimidazole. The catalyst may be provided in an approximately 0.2-0.7 M solution in acetonitrile.

At least four others of the dispensers $120^6$-$120^9$ contain the four basic nucleoside phosphoramidites for oligonucleotide synthesis. The selection of the actual nucleosides used will depend on whether RNA or DNA is to be synthesised. Additional nucleoside phosphoramidites may be provided in respective dispensers 120 if the oligonucleotides to be synthesised comprise non-standard nucleotide residues. The nucleoside phosphoramidites may be provided in solution with acetonitrile having a concentration in the range 0.02-0.2 M, sufficient to provide approximately a 1.5-20-fold excess over the molecular precursor bound to the substrate 10 at the sites 20.

Additional dispensers 120 may be provided as desired for capping, oxidation and other reagents of the kind conventionally used in oligonucleotide synthesis.

A second outlet 111 of the flow cell 100 is connected to a waste reservoir 135 via a waste conduit 132 that comprises a selectively operable valve 133.

A Peltier heater 140 is provided for controlling the temperature of the flow cell 100, but in other embodiments different kinds of heaters may be employed. In the present embodiment, the Peltier heater 140 is capable of controlling the overall temperature of the substrate 10 in the range 20-60° C.

A Q-switched pulsed UV scanning laser 150 is also provided, which is arranged to direct a focused beam of ultraviolet light 152 through the transparent window 102 onto the reverse face 14 of the substrate 10. Specifically, the wavelength of the laser matches the wavelength which the substrate 10 is transparent. Thus, the laser may have a wavelength of about 355 nm or 405 nm. The laser 150 is mounted on a 2D XY translation stage 160, so that the position of the laser 150 can be moved under computer control to direct the beam 152 onto the selected ones of the sites 20 for masking those sites as described below. It will be appreciated that directing the laser beam 152 onto the disc 25 at one of the sites 20 will cause the disc 25 to get warmer, thereby applying thermal energy at the site 20.

A computer 170 is provided with suitable interfaces that are connected to the valves 107, 115, 133, $121^{1-n}$, to the Peltier heater 140, to the laser 150 and to the translation stage 160. In this way, operation of the apparatus can be carried out under control of the computer 170.

The method of oligonucleotide synthesis in accordance with a third embodiment of the invention, using the substrate 10 and apparatus of the invention as hereinbefore described, is described below with reference to FIGS. 1(a)-(d) and FIG. 4. An alternative method of operating the apparatus in accordance with a fourth embodiment is illustrated schematically in FIG. 5.

Figure 4:
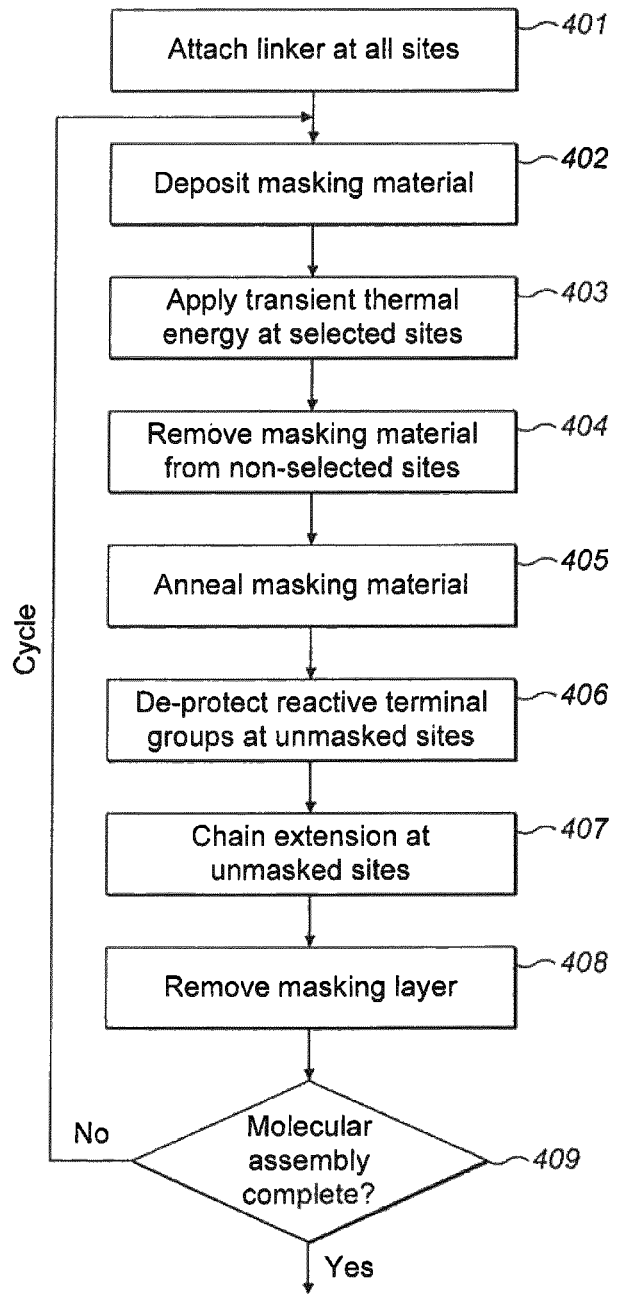
FIG. 4 is a flow chart showing a method of molecular assembly in accordance with a third embodiment of the invention.

With reference to FIG. 4, in step 401 the substrate 10 is prepared for use as described above by attaching protected nucleosidic or non-nucleosidic linkers to the attachment agent provided at each of the sites 20. As described above, the linker in the present embodiment comprises a nucleoside that is attached by its 3'-hydroxyl group to the surface via a succinate arm and the attachment agent. The 5'-hydroxyl group of the nucleoside is protected using DMT as known in the art.

Figure 1B:
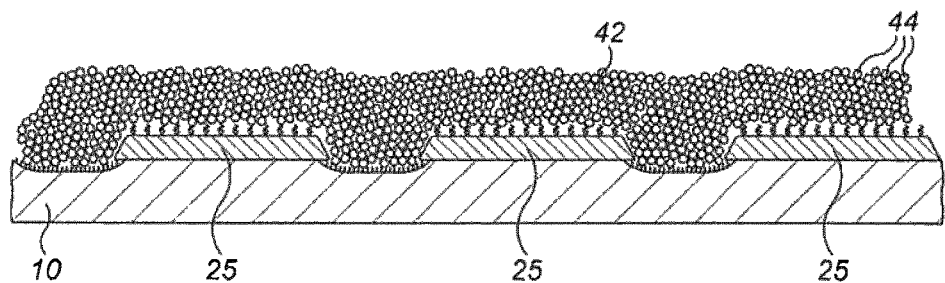
FIG. 1(b) is a schematic sectional view through the substrate of FIG. 1(a) showing the surface covered with a layer of nanoparticles of masking material in a first removable phase.

In step 402 the temperature of the substrate 10 within the flow chamber 100 is controlled to about 30° C., which is close to the freezing point of the tetracosane nanoparticles in the second dispenser $120^2$. Another temperature may be suitable if a different masking material is used. Valve $121^2$ is then actuated to deposit onto the obverse face 12 of the substrate 10 an amount of the dispersion of nanoparticles. Upon opening valve 107, the acetonitrile solvent is evaporated under vacuum at 1 mbar, producing a substantially evenly distributed layer 42 of nanoparticles 44 on the obverse face 12 as shown in FIG. 1(b). Suitably, the layer 42 has a thickness of about 10 µm. At this stage, the nanoparticles 44 are loose on the substrate 10, in that they are not attached to the substrate and can be easily removed therefrom.

Figure 1C:
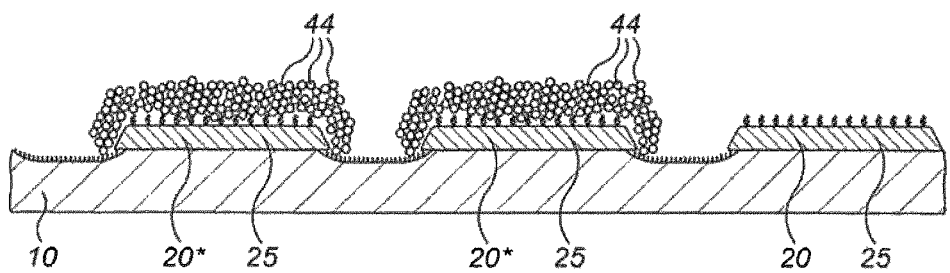
FIG. 1(c) is a schematic sectional view through the substrate of FIGS. 1(a) and 1(b) showing the masking material in a second partially fused phase at selected ones of the functionalised sites.

In step 403, the substrate is kept under vacuum, and data is sent from the computer 170 to the scanning laser 150 and translation stage 160 to direct the laser beam 152 to the reverse face 14 of the substrate 10 to heat the discs 25 at the selected ones of the sites 20 in turn, dependant on the data from the computer. In FIGS. 1(c) and (d) the selected sites 20 are indicated by *—i.e. 20*. Transient heating of the disc 25 at each selected site 20* above the melting point of the nanoparticles causes the nanoparticles 44 in the vicinity of the heated disc 25 partially to melt and coalesce. The nanoparticles 44 thus undergo a phase change as a result of the application of thermal energy at the selected sites 20* such that they wet the surface of the substrate 10.

The absorbed heat of fusion of the nanoparticles 44 limits the temperature rise of the disc 25 at each selected site 20*. A short pulse of heat, e.g. about 10 ns, allows the heat to disperse into the substrate 10 before a larger area of nanoparticles can melt. The energy delivered by the laser pulse should be sufficient to raise the temperature of the disc by about 25° C. to about 55° C. and to provide the heat of fusion for a volume of nanoparticles 44 extending about 200 nm from the disc 25. Allowing for coupling inefficiencies and nanoparticle size, etc., this may be between about 50 pJ to 5 nJ per laser heating pulse. In order to achieve greater melting and coalescence, but within a limited area, a series of further heating pulses may be used, each such pulse being separated by a period of cooling. For example a series of 100×10 ns heating pulses with 10 microseconds of cooling between each successive pulse.

Once the nanoparticles 44 have been melted at the selected sites 20*, the pressure of the system may be returned to 1 bar. In step 404, the substrate 10 may then be washed in acetonitrile by actuating the valve $121^3$ for the third dispenser $120^3$ to remove the non-coalesced nanoparticles 44 that remain in the first removable phase through the waste conduit 132, before again opening valve 107 and drying under vacuum. In this step the nanoparticles at the non-selected sites 20 are washed away as shown in FIG. 1(c).

Figure 1D:
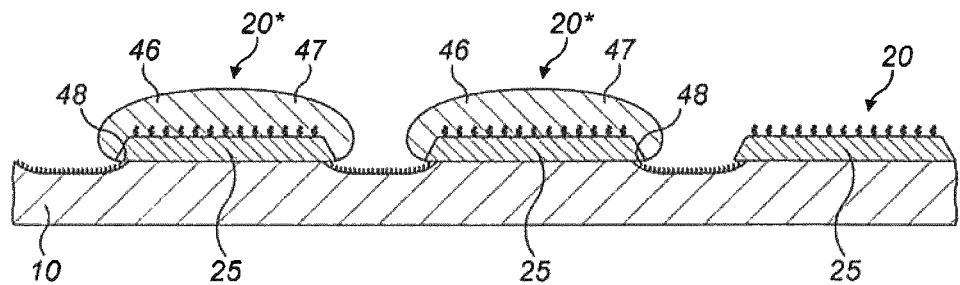
FIG. 1(d) is a schematic sectional view through the substrate of FIGS. 1(a), 1(b) and 1(c) in which the masking material has been annealed at the selected sites to form a non-porous mask.

The melting and coalescence of the nanoparticles 44 in step 403 may be sufficient to form a non-porous masking layer at each of the selected sites 20*, in which case step 405 (see below) may be omitted. However, more typically the melted and coalesced nanoparticles 44 remain porous with a relatively low density after steps 403 and 404. In step 405, therefore, the temperature of the substrate 10 is adjusted using the Peltier heater 140 above the melting point of the nanoparticles (for tetracosane, this may be to a temperature of, for example, about 55° C.) to anneal the retained nanoparticles 44 at the selected ones of the sites 20* to form a uniform high density layer 46. The nanoparticles 44 thus undergo a further phase change to form a non-porous masking layer 46 at each of the selected sites 20*, while leaving the non-selected sites 20 unmasked, being free of masking material, and therefore accessible to the reagents for oligonucleotide synthesis, as shown in FIG. 1(d).

As the nanoparticles 44 melt and coalesce at the selected sites 20*, and are subsequently annealed, they reticulate from the spaces 23 between the sites 20 owing to the low energy surface coating 34. In conjunction with the techniques described above to ensure that the melt-zone around each of the selected sites 20* does not extend too far beyond the discs 25, this helps to provide an accurate, high resolution mask on the obverse face 12 of the substrate 10.

In addition, as the nanoparticles 44 melt at the selected sites 20*, they flow into the undercut region 27 around the periphery of each of the discs 25. The temperature of the substrate is then lowered to about 20 C., causing the masking material to solidify at the selected sites 20* to form a high-density, non-porous cap 47 over the discs 25. Where the masking material extends into the undercut regions 27 around the discs 25, it forms a turned-in rim 48 that serves to anchor mechanically the cap 47 to the disc 25. This helps to retain the masking layer 46 of masking material on each disc 25, even if volatile solvents penetrate into the space between the cap 25 and the cap 47.

The pressure in the system may then be returned to 1 bar.

In this way selected sites 20 are latched into a closed state by the transient application of thermal energy.

In step 406, valve $121^1$ is operated to apply trichloroacetic acid to the non-selected sites 20. The trichloroacetic acid serves to de-protect the molecular precursors at the non-selected sites by removing the protecting 5'-DMT group. In this embodiment, the molecular precursors at the selected sites 20* remain protected, since the trichloroacetic acid is unable to reach the selected sites owing to the masking layer 46.

In step 407, nucleoside attachment is performed in the conventional manner by exposing all of the non-selected, unmasked sites 20 on the substrate 10 to a selected nucleoside phosphoramidite and catalyst in acetonitrile, as known to the art. Specifically, the required nucleoside phosphoramidite is deposited onto the substrate 10 through the inlet conduit 114 by opening the one of the valves $121^{6-9}$ that corresponds to the dispenser $121^{6-9}$ containing the required nucleoside phosphoramidite. Valve $121^5$ is also opened, so that the catalyst is mixed with the nucleoside phosphoramidite within the inlet conduit 114 and mixing manifold 124.

It should be noted that the reagents for oligonucleotide synthesis may be co-soluble with the masking material, but if the eutectic freezing point of the masking material and reagent mixture is above the reaction temperature (which will generally be true for nucleosides at room temperature using tetracosane or eicosane as the masking material) then the masking layer 46 will remain impermeable to the extrinsic reagents owing to its high density (void free) solid phase.

Once the incremental chemistry is complete at the non-selected sites 20, any unreacted reagents are flushed from the substrate in acetonitrile, by operating valve $121^3$ to deliver acetonitrile into the flow cell 100 via the inlet conduit 114. Thereafter, any un-reacted 5'-OH groups on the molecular precursors may be capped, by treating the substrate-bound material with a mixture of acetic anhydride and 1-methylimidazole (or DMAP) as catalysts, and the newly formed tri-coordinated phosphite triester linkage oxidised with iodine and water in the presence of a weak base (e.g., pyridine, lutidine or collidine), as known in the art. After completion of these steps, the substrate 10 is again washed with acetonitrile.

By this stage, the linker 32 at each of the non-selected sites 20 has been extended by one nucleoside residue. The linkers 32 at the selected (masked) sites 20* remain protected with DMT and un-extended.

In step 408, the masking layers 46 at each of the selected sites 20* may be completely removed by dissolving in an appropriate volatile, non-polar solvent such, for example, as a lower alkane. In the present embodiment, pentane is delivered from the fourth dispenser $120^4$ by opening the valve $121^4$.

Thereafter, steps 402-408 as described above may be repeated for one or more further cycles, each time using a different nucleoside phosphoramidite, and each time selecting different sites 20 for masking in step 403, so that within each cycle at least some of the sites 20 that have been masked in the or all previous cycles remain unmasked for chain extension. Typically four cycles may be carried out for oligonucleotide synthesis, using the four standard nucleotides, but the cycle 402-408 is repeated until the molecular precursors at all of the sites 20 have been extended by one residue. In step 409, at the end of each cycle, a check is performed by the computer 170 to determine whether all of the sites have been incrementally extended.

Thereafter, steps 402-408 may be repeated for one or more further rounds as described above, such that within each round, each site is extended by one further nucleotide residue. It will be understood that for each round after the first, chain extension occurs by de-protecting the 5'-OH group of the nucleotide residue added during the immediately preceding round. Thus, as is known in the art, oligonucleotide synthesis proceeds in the 3' to 5' direction.

In some variants of the method of the third embodiment described above, it is unnecessary for chain extension to occur at all of the sites 20 before chain extension can be repeated at any sites. In the third embodiment, chain extension by a single nucleotide occurs at all of the sites before chain extension by one or more further nucleotides occurs at any of the sites. However, since the de-protecting step 406 occurs within each cycle, it may be applied equally to the initial linker 32 or to a previously added nucleotide residue. In this way, it is not strictly necessary for the oligonucleotide synthesis to proceed in synchronisation across all of the sites 20, although that may be convenient. In such variants, therefore, within each cycle, any sites may remain unmasked regardless of the number of previous incremental additions, and the oligonucleotides at different sites 20 may grow at different rates. It will be understood that this principle applies not only to the present embodiment using oligonucleotide synthesis, but is equally applicable to any method in accordance with the invention where the de-protection step occurs within each cycle and each chain extender molecule comprises a protected terminal reactive group.

Figure 5:
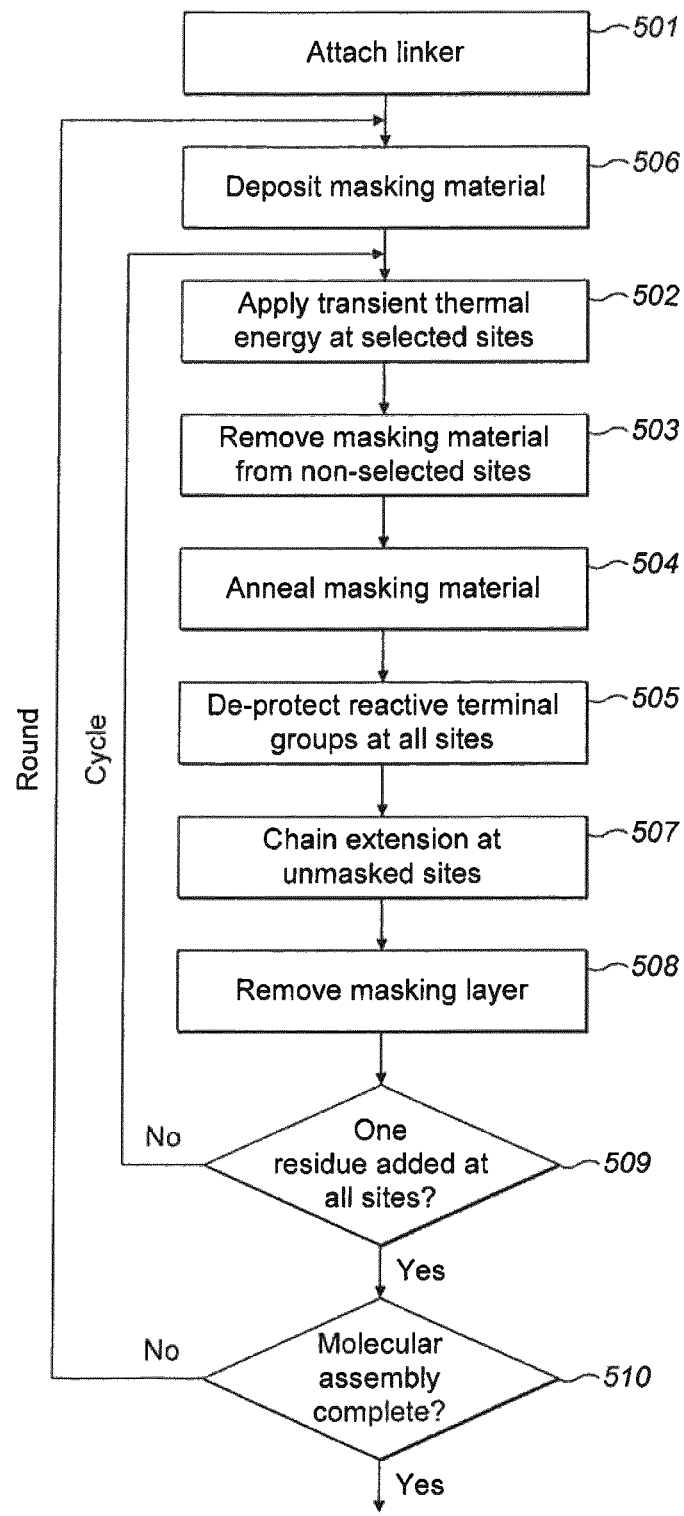
FIG. 5 is a flow chart showing an alternative method of molecular assembly in accordance with a fourth embodiment of the invention.

Another variant of the above-described third embodiment is illustrated schematically in FIG. 5. The method of FIG. 5 according to a fourth embodiment of the invention comprises steps 501-509 which correspond respectively to steps 401-409 of the third embodiment, but the de-protection step 506 occurs before step 502 in which the masking material is deposited on the obverse face 12 of the substrate 10. The technical features of all of steps 501-509 of the fourth embodiment are similar to the respective corresponding steps 401-409 of the third embodiment and need not be described again here.

In accordance with the method of the fourth embodiment, unlike the method of the third embodiment, it is necessary for chain extension to occur in synchronisation across all of the sites 20. All of the linkers 32 are de-protected in step 506 before the substrate 10 is masked, and there is no opportunity for de-protecting newly added nucleotide residues until incremental chain extension by a single nucleotide has occurred at all of the sites 20 through one or more cycles of steps 502-505 and 507-508. In step 509, at the end of each cycle, a check is carried out to see whether chain extension has occurred at all of the sites 20. If it has not, then another cycle is carried out. Once all of the sites have been extended by a single nucleotide residue, in step 510, the computer checks whether oligonucleotide synthesis at all of the sites has been completed in accordance with the control data. If it has not, then steps 501-509 are repeated for one or more further rounds until oligonucleotide synthesis is complete, with step 506 preceding each separate cycle within the or each further round.

In yet another variant of the above-described methods, the linkers 32 are not attached directly to the discs 25, but instead are surface-attached to carrier particles that are adhered to the discs 25.

Figure 6A:
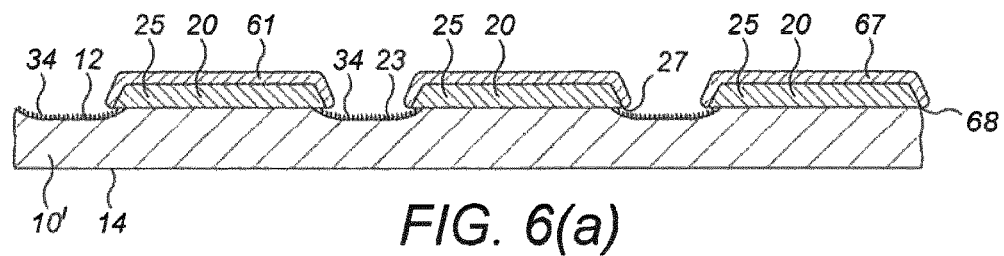
FIG. 6(a) is a schematic sectional view through another substrate according to a fifth embodiment of the invention having a surface defining an array of functionalised sites, each of which comprises a heating element and is functionalised with a layer of an adhesive polymer.

Thus, FIG. 6(a) shows another substrate 10' for molecular assembly in accordance with a fifth embodiment of the invention, which is similar to the substrate 10 of the first embodiment shown in FIGS. 1(a) and 2 and described above. The same reference numerals are used for like parts of the two substrates 10, 10', and it is unnecessary to describe those parts again in detail here. However, unlike the substrate 10 of the first embodiment, in the substrate 10' of the fifth embodiment, the metal discs 25 at the sites 20 are not treated with a thiol attachment agent, but instead are coated with a layer of a low melting point polymer 61. Any suitable polymer may be used as generally described above, but in the present embodiment, polycaprolactone is used, which has a melting point of about 60° C.

The polycaprolactone is applied to the obverse face 12 of the substrate 10' by spin coating in a suitable solvent such, for example, as dichloromethane or toluene to form a film of uniform thickness, e.g., about 100 nm. In the present embodiment, 1% polycaprolactone dissolved in a solution of a 1:4 mixture of dichloromethane and toluene is spun-coated at about 3000 rpm. However, other methods of deposition of the polycaprolactone onto the substrate 10' may be used.

The surface is then heated to a temperature of about 255° C. to melt the polycaprolactone, which reticulates from the spaces between sites 20 that are coated with a low energy surface coating 34 such as trichloro-fluoroalkysilane as described above. In its molten form, the polycaprolactone flows into the undercut regions 27 around the peripheral edge of the discs 25, so that when the substrate 10 is re-cooled and the polymer solidifies, it forms a solid cap 67 over each disc 25 with a turned-in rim 68 that engages under the disc 25 in the undercut region 27 to anchor mechanically the polycaprolactone cap 67 at each site 20. This serves to protect the polycaprolactone cap 67 against delamination from the disc 25, even in the event of the ingress of volatile solvents or the like into the joint between the cap 67 and the disc 25.

Figure 6B:
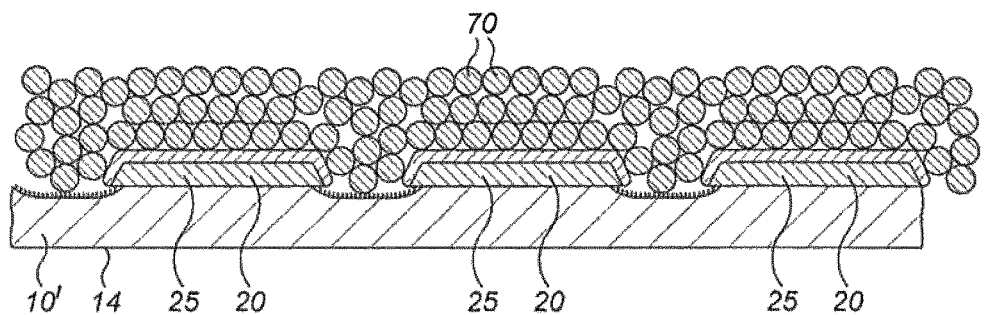
FIG. 6(b) is a schematic sectional view through the substrate of FIG. 6(a) showing the surface covered with a layer of carrier beads.

Carrier particles such as polystyrene beads 70 are then deposited on the substrate 10' as shown in FIG. 6(b). Any suitable carrier particles known to those skilled in the art may be used, but in the present embodiment polystyrene beads having a diameter of about 0.5 μm are used. Beads of this kind of well-known for use in bead synthesis robots for oligonucleotide synthesis and other molecular assembly. The beads 70 carry on their surface a molecular precursor (not shown) for initiating incremental molecular assembly. In the fifth embodiment, the beads are coated with a suitable attachment agent having a free terminal amino group and a nucleosidic or non-nucleosidic linker of the kind described above in relation to the first embodiment. In some embodiments, the molecular precursors on the beads 70 may conveniently comprise a short oligonucleotide tag of 2-5 nucleotides. Such a tag may be the same for all of the beads 70.

In order to attach the beads 70 to the substrate 10', the substrate 10' is heated to a temperature close to the melting point of the polymer 61, which serves to soften the polymer 61 and render it sticky and/or viscous. Thus, the temperature of the substrate 10' in the present embodiment may be raised to about 60° C., which is the melting temperature of polycaprolactone. The melting point of the polymer 61 should be lower than the melting temperature of the material used for the beads 70.

Figure 6C:
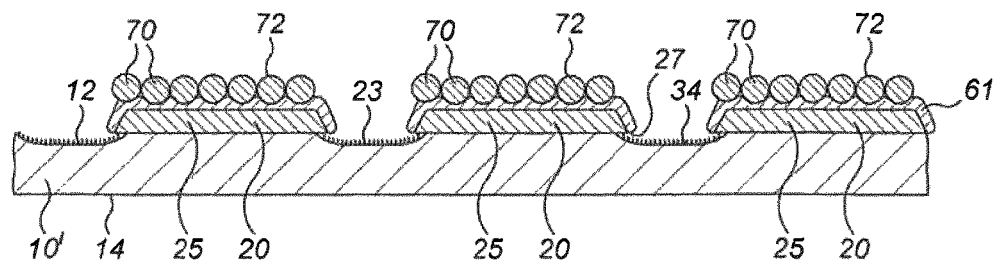
FIG. 6(c) is a schematic sectional view through the substrate of FIGS. 6(a) and 6(b) showing a single layer of carrier beads at each site that are adhered to the adhesive polymer.

The temperature of the substrate 10' is then lowered, causing the lower layer of beads 70 to stick to the obverse face 12 of the substrate 10' at the sites 20. The excess beads may then be removed, using a jet of inert gas such, for example, as nitrogen, or a jet of a suitable liquid, e.g., perfluorodecalin, leaving islands of bead clusters 72 at the site 20 as shown in FIG. 6(c).

Figure 6D:
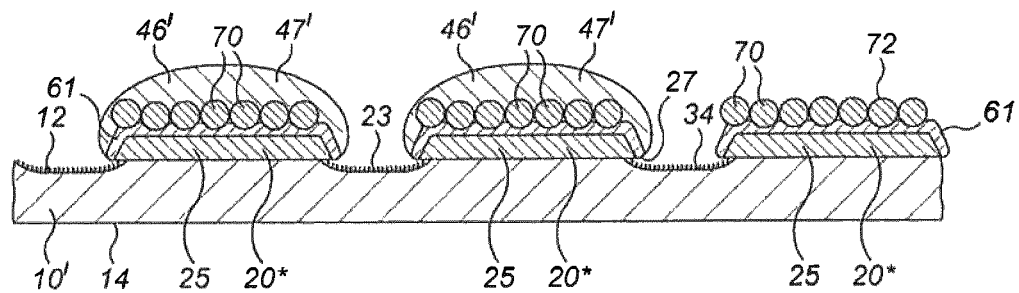
FIG. 6(d) is a schematic sectional view through the substrate of FIGS. 6(a), 6(b) and 6(c) in which a non-porous layer of masking material has been annealed over the carrier beads at selected sites to form a mask.

The substrate-attached beads 70 may then be used for oligonucleotide synthesis using nucleoside phosphoramidites as known in the art—for example as described above with reference to FIGS. 3-5. In the masking steps 403-405; 503-505, the layer of masking material 46' is simply applied over the top of the bead clusters 72 that are adhered at those sites, and forms a solid, non-porous cap 47' at each of the selected sites 20* over the beads 70 as shown in FIG. 6(d), so that chain extension may occur at the non-selected (unmasked) sites without affecting the selected sites 20*. Otherwise, the methods are substantially the same as described above and need not be repeated here.

Figure 7:
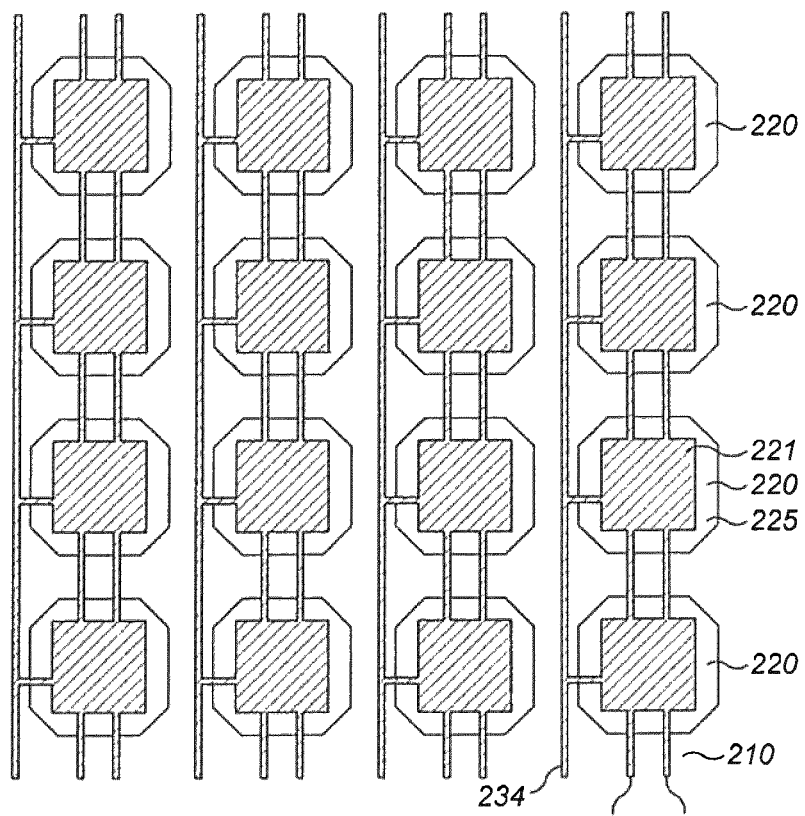
FIG. 7 shows schematically in plan view another substrate for molecular assembly according to a sixth embodiment of the invention that comprises a silicon chip having an array of functionalised sites, each of which comprises a micro-heater.
Figure 8:
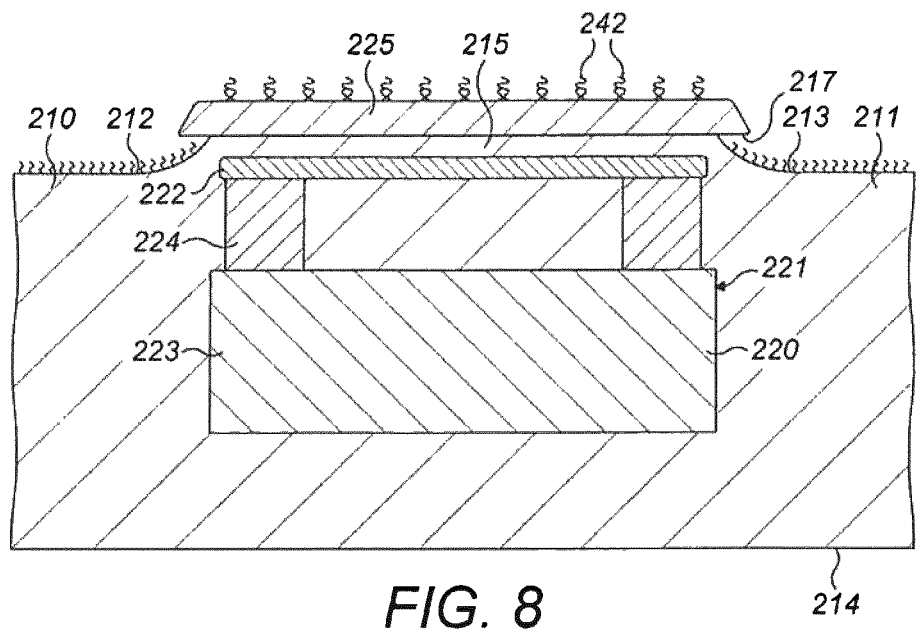
FIG. 8 is an enlarged schematic side view of one of the functionalised sites of the substrate of FIG. 7 showing the micro-heater and its driver circuit.
Figure 9:
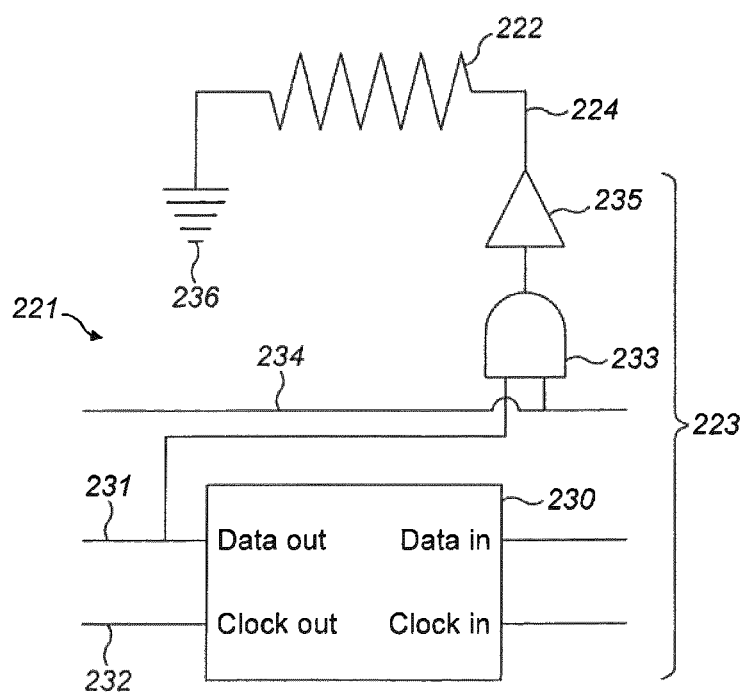
FIG. 9 is a circuit diagram of the micro-heater of FIG. 8 showing its logic controller.

Another substrate 210 in accordance with a sixth embodiment of the invention is illustrated in FIGS. 7-9. The substrate 210 comprises a silicon chip 211 having an obverse face 212 and reverse face 214. The dimensions of the silicon chip in the present embodiment are 18 mm×18 mm, and the obverse face 212 comprises a multitude of sites 220, of which only twelve are illustrated schematically in FIG. 7 for clarity. The spacing between the sites 220 in this embodiment is about 200 nm, and the obverse face 212 of the substrate 210 comprises more than 10 million sites 220.

As best seen in FIG. 8, at each site 220, the chip 211 comprises a micro-heater 221 that includes a miniaturised resistive heating element 222 embedded in the chip below its obverse face 212, a driver circuit 223 and a connector 224 for connecting the driver circuit to the heating element 222. On the obverse face 212, the micro-heater 221 comprises a disc 225 of metal or another conductive material, which is similar to the discs 25 used in the substrate 10; 10' of the first and fifth embodiments described above, but on a smaller scale.

In the sixth embodiment, the miniaturised heating element 222 comprises a serpentine track formed of copper, but other suitable conductive materials may be used such, for example, as aluminium or gold, or carbon in the form of diamond or a glassy carbon film. Other suitable kinds of micro-heating elements will also be known to those skilled in the art.

The driver circuit 223 is illustrated in more detail in FIG. 9, and comprises a data latch 230 having a first input that is connected to a data path 231 and a second input connected to a data-clock path 232 running through the chip 211, also as shown in FIG. 7. The data latch 230 is connected to one of the inputs of an AND gate 233, the other input of which is connected to an activation control line 234 in the chip 211. The output of the AND gate 233 is connected to a suitable driver current source 235 which thus supplies power to the heating element 222 under data control. A suitable current sink 236 for the micro-heater 222 is also provided as shown.

The chip 211 further comprises a plurality of chains of 16-bit control logic elements (not shown), which control logic elements can store and respond to control data sent from a computer as a series of shift register chains. Each control logic element is arranged to control a cluster of sixteen micro-heaters 221 via their respective data paths 231. Data may be sent from the computer to the chip 211 as a sequence of 16-bit words along the control logic element chains describing which of the sites 220 should be activated. When the data is transmitted, the 16-bit words are stored within the respective control logic elements.

The connector 224 serves to connect the driver circuit 223 to the micro-heater 222, and may be made from any suitable conductive material.

The disc 225 in the sixth embodiment is generally hexagonal as illustrated in FIG. 7 having a maximum dimension in the plane of the surface of the chip 211 of about 1 μm. However, the shape of the discs 225 may be varied as required, and their size may be adjusted generally within the range 400 nm to 2 μm to provide a spacing on the obverse face 212 of the substrate 210 of about 100-500 nm. The disc 225 is made of gold, but in other embodiments, the discs 225 may be made from an alternative metal such, for example, as platinum, chromium, tantalum, copper or aluminium. In a further alternative, the discs may be made from doped polysilicon. Suitably however the discs 225 serve to differentiate the surface of the chip 211 at the sites 220 from the surface of the chip 211 between the sites, which is made of silica.

Upon the application of power to the micro-heater 222, thermal energy is transmitted through the body of the chip 211 to the disc 225, such that the temperature of the disc 225 is raised.

For use in molecular assembly, the surface of the disc 225 at each site 220 is treated with a suitable attachment agent such, for example, as an amino alkylthiol, as described above with reference to the first embodiment with a free terminal amino group. Amino alkylthiol is suitable for use with a gold surface such as the discs 225, but in other embodiments where the discs 225 are made from a different material such, for example, as silica, a different kind of attachment agent may be suitable, e.g., an aminoalkyl silane.

The substrate 210 of the sixth embodiment may be used for oligonucleotide synthesis as described above with reference to the first to fifth embodiments. Alternatively, like the substrate 10; 10' of the first and fifth embodiments, the substrate 210 of the sixth embodiment may be used for the molecular assembly of oligosaccharides, Click chemistry, or for the synthesis of peptides.

For the synthesis of peptides, the attachment agent at each site 220 is suitably functionalised with a peptide molecular precursor. Said molecular precursor may comprise a linker 242 of the kind known in the art for solid-phase peptide synthesis such, for example, as a Rink linker or the like. Alternatively, the molecular precursor may comprise a single amino acid or short peptide tag of several (e.g., 2-10) amino acids that is bonded to the terminal amino group of the attachment agent. Suitably, all of the sites 220 on the chip 211 may comprise the identical molecular precursor. The molecular precursor has a free terminal amino group that is protected using a suitable amino protecting group of the kind known in the art for use in SPPS. In the sixth embodiment, the amino group of the molecular precursor is temporarily protected using t-Boc.

In yet another embodiment of the invention, polystyrene carrier beads of the kind described above with reference to the fifth embodiment may be attached to the metal disc 225 at each site 220, which beads have an average diameter of about 100 nm and carry on their outer surface a linker or molecular precursor of the kind described above having a protected free terminal amino group.

As shown in FIG. 8, in a manner similar to the first and fifth embodiments, the obverse face 212 of the chip 211 is etched away between the sites 220 to form a hollow region 213 between adjacent sites, such that at the sites 220, the obverse face 212 stands proud to form a mesa 214. The size of the disc 225 is slightly greater than the size of the mesa 214, so that the disc 225 overhangs the edges of the mesa 214 to form an undercut region 217 as best shown in FIG. 8. This undercut region 217 serves a similar purpose to the corresponding undercut region 27 in the first and fifth embodiments described above, in that it forms a topological anchor for a layer of polymer, such as polycaprolactone, for attaching beads or other carrier particles to the disc 225 as described above and/or a cap of masking material.

Figure 10:
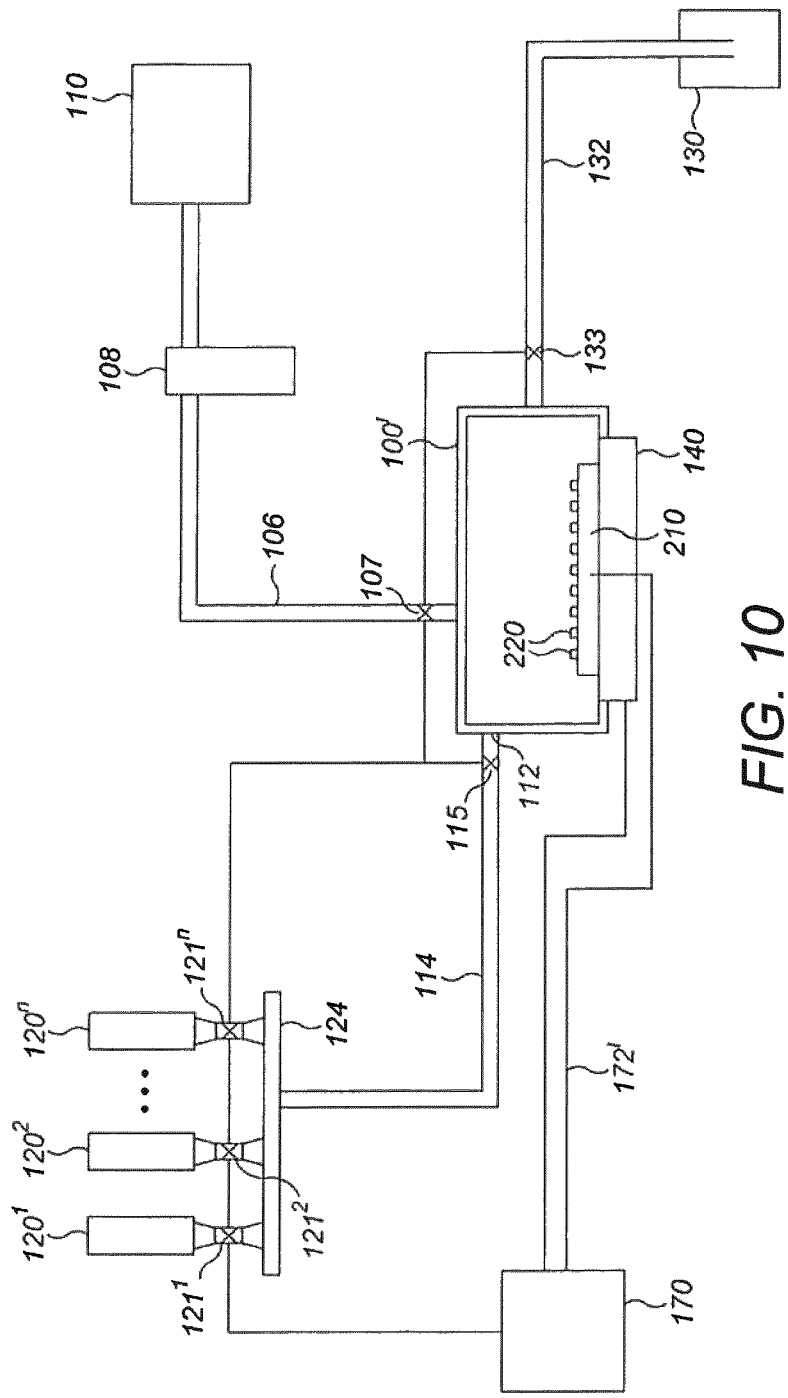
FIG. 10 shows schematically a general arrangement of equipment for performing molecular assembly using the substrate of FIGS. 7-9 in accordance with a seventh embodiment of the invention.

FIG. 10 shows schematically the general arrangement of equipment in accordance with a seventh embodiment of the invention, including the substrate 220 of the sixth embodiment, for use in automated solid-phase peptide synthesis (SPPS). Most of the components of the equipment of the seventh embodiment are the same as used in the equipment of the third embodiment described above, and for such like components the same reference numerals are used for clarity and to avoid repetition.

In the equipment of the seventh embodiment, the substrate 220 is housed within a flow cell 100'. The difference between the flow cell 100' of the seventh embodiment and the flow cell 100 of the third embodiment described above is that the flow cell 100' of the seventh embodiment does not have a transparent window, because the micro-heaters 221 at the sites 220 include heating elements 222 as described above, so there is no need to provide a laser for applying thermal energy to the sites 220. Similarly, the translation stage 160 of the third embodiment is also omitted from the equipment of the seventh embodiment. Instead, the computer 170 is connected to the chip 211 via a data control line 172', as well as to the other components of the equipment as described above.

The data control line 172' serves to transmit the above-mentioned series of shift register chains comprising the control data to the control logic elements within the chip 211. The computer 170 also sends to the chip 211, via the data control line 172', a clock signal that is transmitted to each of the driver circuits 223 through the data-clock path 232, and an activation signal that is transmitted along the activation control line 234.

As in the third embodiment, the equipment of the seventh embodiment comprises a plurality of dispensers $120^1$-$120^n$, each with a respective selectively operable valve $121^1$-$121^n$.

The first dispenser $120^1$ comprises a solution of 10% trifluoroacetic acid (TFA) in dichloromethane for removing the t-Boc protecting groups on the molecular precursor at the sites 220.

The second dispenser $120^2$ contains a dispersion of tetracosane nanoparticles in acetonitrile. The nanoparticles have a diameter of about 30 nm, and the dispersion contains about 10% solids. The tetracosane serves as the masking material for the substrate at the selected sites 220.

The third dispenser $120^3$ contains acetonitrile.

The fourth dispenser $120^4$ contains pentane.

At least twenty-two others of the dispensers $120^5$-$120^{26}$ contain the standard amino acids for peptide synthesis dissolved in acetonitrile, propylene carbonate or ethylene carbonate. In the seventh embodiment, acetonitrile is used. Additional amino acids may be provided in respective dispensers 120 if the peptides to be synthesised also comprise non-standard amino acid residues. In the event that it is intended to synthesised peptides that do not incorporate the full complement of standard amino acids, fewer dispensers may be used as required.

The amino acids suitably have a protected amino group. In the seventh embodiment, t-Boc is used.

The amino acids also comprise an activated carboxyl group. Any suitable activating group known to those skilled in the art for use in SPPS may be employed, but in the seventh embodiment, the amino acids comprise a carbodiimide activating group such, for example, as dicyclohexylcarbodiimide (DCC).

To prevent undesired side reactions, all other functional groups present in the amino acids are rendered unreactive by attaching suitable protecting groups such, for example, as benzyl or t-butyl protecting groups as known in the art which can be removed after completion of the peptide chain assembly using trifluoroacetic acid.

Additional dispensers 120 may be provided as desired for capping or other reagents of the kind conventionally used in peptide synthesis. For instance, additional dispensers 120 may comprise any additional reagents that may be needed for removing any protecting groups on the side chains of the amino acids after the completion of peptide synthesis.

Peptide synthesis using the equipment of the seventh embodiment as described above with reference to FIG. 10 may be conducted using methods similar to those of the fourth and fifth embodiments of the invention as described above with reference to FIGS. 4 and 5. That is, peptide synthesis may proceed by a plurality of cycles, wherein during each cycle one or more selected sites 220 on the substrate 210 are masked using the tetracosane masking material, and the molecular precursors at each of the non-selected sites 220 that remain un-masked are then extended by the same one amino acid residue from one of the dispensers $120^5$-$120^{26}$. Up to twenty-two cycles will generally be needed to extend all of the sites by one amino acid, one for each of the standard amino acids—more if non-standard amino acids are also used. After each cycle, as described above, the masking material may be completely removed from the substrate 210 by dissolving it in pentane from the fourth dispenser $120^4$. The free terminal amino group on the molecular precursor at each site 220 may be de-protected within each cycle after the masking step as per the fourth embodiment, or de-protection of all of the sites 220 may be done simultaneously before the masking step as per the fifth embodiment.

Once all of the sites 220 have been extended by one amino acid residue, the method may be repeated for one or more further rounds, each comprising a plurality of cycles, to extend incrementally the growing peptide chain at each site until the desired chain length has been reached. Typically at least five rounds, each comprising up to twenty-two or more cycles using different respective amino acids, may be performed, and often more than ten, twenty or fifty rounds to produce surface-attached peptides of the desired length.

As described above, if the method of the fourth embodiment is used, it is not strictly necessary for incremental chain extension to occur synchronously at all of the sites 220, and a different order of chain extension may be employed, such that the peptide chains grow at different rates at the different sites 220.

In order to mask the selected sites 220 on the substrate 210 in each cycle, a quantity of the dispersion of tetracosane nanoparticles in acetonitrile is dispensed onto the substrate 210 from the second dispenser $120^2$ in a manner similar to the third and fourth embodiments, and the acetonitrile is then allowed to evaporate under vacuum at about 1 mbar to produce an evenly distributed layer of dried nanoparticles of about 10 µm thickness. In this state, the nanoparticles are disposed on the obverse face 212 of the substrate 210 in a first loose phase which does not wet the surface of the substrate 210 and can therefore easily be removed.

Thereafter, instead of using a scanning laser to apply thermal energy to the selected sites to procure the requisite phase change in the masking material, control data is sent from the computer 170 to the chip 211 describing which of the sites 221 should be masked. As mentioned above, in the seventh embodiment this control data is stored in the control logic elements for clusters of micro-heaters 221. Thereafter, an activation control signal is sent from the computer 170 to initiate a sequence of transitory site actuations by each control logic element in parallel. Within each of the 16-bit words by which the control data is transmitted to the logic control elements, each individual bit corresponds to a respective one of the sites 220 within the cluster. Upon initiation by the activation control signal, the bits are read serially according to the clock signal to determine whether each site 220 within the cluster should be actuated or not.

Where the control data indicates that a given site 220 should be actuated, upon receipt of the control data, the clock signal and the activation signal, an electrical energy pulse is caused or allowed to flow from the current source 235 through the micro-heater 222 This pulse is short in time, e.g. around 1 ns, and of a sufficiently high intensity that the thermal energy applied at the site 220 causes a phase change of the nanoparticles in the vicinity of the disc 225 which at least partially melt and coalesce, thus wetting and adhering to the surface of the disc 225.

The absorbed heat of fusion of the tetracosane limits the temperature rise of the micro-heater. A short pulse of heat, e.g. 1 ns, allows the heat to disperse into the substrate 210 before a larger area of nanoparticles can melt. In order to achieve greater melting and coalescence, but within a limited area, a series of heating pulses may be generated, each pulse within the series being followed by a period of cooling. For example a series of 10×1 ns heating pulses with 1 µs of cooling between successive pulses. Suitably, the thermal energy applied at each site 220 is sufficient to procure the phase change in the masking material, but does not significantly raise the temperature of the substrate 210 or masking material at the site 220. This helps to produce a high resolution mask on the substrate 210.

For a chip containing a billion sites 220, the use of control logic elements, each of which governs a cluster of sixteen micro-heaters 221 allows 1/16 of the total number of sites 220 to be actuated in parallel, e.g. allowing about 50 million sites to be activated concurrently. In order to allow for efficient power distribution on the chip 211, these actuation events may be staggered further by means of a controlling clock sequence, so that in practice only, for instance, 10,000 actuations are effected concurrently in any 100 µs period, thus providing for actuation of a billion sites over a period of roughly 10 seconds and thereby a more uniform power loading of the chip 211 during actuation and a lower rate of thermal dissipation requirement from the chip substrate 210.

Once the phase change of the masking material has occurred at each of the selected sites 220, the pressure within the flow cell 100' can be returned to 1 bar under nitrogen, and the masking material that remains in the first phase of the non-selected sites 220 is removed by washing the surface of the substrate 210 with acetonitrile as described above.

The temperature of the whole substrate 210 is then raised above the melting point of the masking material, which in the seventh embodiment is about 55° C. for tetracosane, in order to bring about a further phase change in which the masking material nanoparticles retained at the selected sites 220 are annealed to form a uniform high density masking layer.

Within each cycle, once the substrate 210 has been masked at the selected sites 220, and the free terminal amino group on the molecular precursor has been de-protected, the valve 121" corresponding to the amino acid for the present cycle is actuated so that the activated amino acid is dispensed onto the substrate 220 through the inlet conduit 114 where it is able to reach the unmasked sites 220. The high density masking layer of tetracosane at the selected sites 220 prevents the amino acid and other reagents for peptide synthesis from reaching the masked sites.

The activated carboxyl group on the amino acid reacts with the free terminal amino group on the surface-attached molecular precursor foaming a peptide bond to extend the molecular precursor at the unmasked sites 220 by one amino acid residue. It will be understood that in the first cycle, chain extension takes place at the free terminal amino group of the molecular precursor and, for each subsequent addition at the same site 220, chain extension occurs at the free terminal amino group of the amino acid residue added during the preceding round, and references to the "molecular precursor" used herein should be interpreted accordingly. That is, during rounds of chain extension after the first, the molecular precursor includes the chain extender moieties added during the preceding round or rounds.

In eighth and ninth embodiments of the invention, which are variants of the methods described above, instead of completely removing the masking layer after each cycle and then re-masking the substrate 10; 10'; 210 to expose different sites 20; 220 for the next cycle of chain extension, the un-masked sites 20; 220 may be masked by applying to the substrate 10; 10'; 210 another layer of masking material and then causing or allowing the masking material to undergo the requisite phase change(s) to form a solid, non-porous masking layer at each of the previously unmasked sites. This may be effected using the methods described above for the third, fourth or seventh embodiments of the invention. The computer 170 controls the scanning laser 150 or the micro-heaters 221, as the case may be, to apply thermal energy only to the previously unmasked sites. In this way, the sites 20; 220 that are "open" in one cycle can be selectively "closed" for the next cycle.

In the eighth embodiment, a fifth dispenser 120''' containing a saturated dispersion of nanoparticles of the masking material—in this case tetracosane—in a low vapour pressure co-solvent for the masking material such, for example, as hexadecane, is provided, with a respective computer-operated valve 121'''. The nanoparticles may conveniently be the same as the ones used in the dispersion held in the second dispenser 120² for use as the masking material.

After masking the previously unmasked sites 20; 220 as described above, one or more of the previously masked sites 20; 220 can be selectively unmasked or "opened" by applying to the substrate 10; 10'; 210 a quantity of the saturated dispersion of nanoparticles of masking material from the dispenser 120''', and holding the temperature of the substrate 10; 10'; 210 using the Peltier heater 140 at a temperature at or near the freezing point of the co-solvent. In the case of hexadecane as the co-solvent, the temperature of the substrate 10; 10'; 210 is held at a temperature just above 19° C., e.g. 19.5-20° C.

The co-solvent is a solvent for the masking material, but when applied to the substrate 10; 10'; 210 at a temperature close to its freezing point, the masking layer at the masked sites 20; 220 remains substantially unaffected. In some variants of the methods described above, the co-solvent may be used alone without the dispersion of nanoparticles. However, the use of such nanoparticles is advantageous because, owing to the Gibbs-Thomson effect, nanoparticles have a lower melting point than the equivalent bulk material. One effect of this property is that at a particular temperature close to the melting point of the nanoparticles, the co-solvent forms a saturated dispersion of the masking material by preferentially melting the smallest nanoparticles and gradually re-depositing the masking material out of the dispersion on to the surface of the substrate 10; 10'; 210. As a result of this, the bulk masking layers at the masked sites 20; 220 are stable in the co-solvent, even when the temperature of the dispersion is increased.

In order to remove the masking layer from the selected previously masked sites 20; 220, thermal energy is applied under computer control at those sites by means of the heating elements as described above, to raise the temperature of the masking material towards its melting point. This differential local heating of the solid masking material at the selected previously masked sites 20; 220 provides the heat of fusion which allows the masking material to dissolve in the co-solvent, so that the local masking layers at the selected previously masked sites may be removed, without affecting the masking layer is at the non-selected previously masked sites.

In the ninth embodiment, the fifth dispenser 120''' contains a polar fluid having a boiling point of at least 75° C. and freezing point lower than about 5° C. The polar fluid is substantially immiscible with the masking material and may have a polarity index of at least 6.0 (as described in The Solvent Guide by Burdick & Jackson Laboratories, 194). Suitable polar fluids comprise water, propylene carbonate and acetonitrile. In the ninth embodiment, water is used. Alternative polar fluids will be known to those skilled in the art.

After masking the previously unmasked sites 20; 220 as described above, one or more of the previously masked sites 20; 220 can be selectively unmasked or "opened" by applying to the substrate 10; 10'; 210 a layer of water (or other polar fluid) from the dispenser 120'''. In order to remove the masking layer from the selected previously masked sites 20; 220, thermal energy is applied under computer control at those sites by means of the heating elements as described above to cause localised melting of the masking material.

For instance, using the equipment of the seventh embodiment, thermal energy may be applied at each of the selected previously masked sites 20; 220 using the micro-heater 221 to apply a succession of 1 ns pulses of energy, with 1 µs between each pulse. Suitably approximately 10,000 pulses may be applied at each site to procure localised melting as desired.

In its high density phase, the masking material is substantially non-porous, but upon localised melting, the masking layer at the selected previously masked sites 20; 220 undergoes a further phase change, characterised by expansion and an increase in molecular disorder, with a concomitant reduction in packing density and an increase in porosity. The masking layer thus becomes locally porous at the selected previously masked sites 20; 220, allowing the polar fluid to penetrate into the masking layer and, owing to the increased affinity of the surface 12, 25; 212; 225 for the polar fluid as compared with the masking layer, the polar fluid displaces the melted masking layer from the substrate 10; 10'; 210 at the selected previously masked sites 20; 220, so that the local masking layers at the selected previously masked sites may be removed, without affecting the masking layer is at the non-selected previously masked sites.

By way of illustration, FIG. 11A is a drawing of a photomicrograph of the surface 312 of a first silicon test chip 311. The chip 311 was made of silicon and fabricated with a silica surface 312. A chromium adhesion layer 314 was used to promote the adhesion of an elongate gold heater bar 325 of 8 µm width to the surface 312. For control purposes, other pieces of gold 340 were also adhered to the surface. The test chip 311 was masked with a non-porous, high density layer comprising a mixture of octodecane and icosane in approximately equal proportions. A layer of water was then applied to the surface and the heater bar 325 was heated by applying a voltage across the bar in 10,000 pulses each of 1 ns duration, with 1 µs between each pulse, in order to melt the masking layer in the vicinity of the heater bar.

The consequential localised phase change of the masking layer allowed the water to penetrate the masking layer and displace the masking material over the heater bar 325. The surface 312 was selectively unmasked in the vicinity of the heater bar 325. The water and displaced masking material was then removed and the surface washed and dried.

Potassium iodide was then applied to the surface for etching exposed areas of gold on the surface. The remainder of the masking layer was then removed from the surface 312.

As shown in FIG. 11B, the potassium iodide accurately etched away the gold of the heater bar 325 exposing the underlying chromium layer 314, but did not affect the other pieces of gold which remained masked.

FIG. 12A is a drawing of a photomicrograph of the surface 412 of a second silicon test chip 411 that was fabricated in a similar manner to the chips 311 of FIGS. 11A and 11B. The surface 412 of the second chip 411 was coated with a thin gold layer 422 that was divided as shown to form two parallel elongate heater bars 425 of 2.5 µm width. A chromium adhesion layer 414 was interposed between the gold and the surface of the chip. The heater bars 425 were insulated from the remainder of the gold layer 422.

The surface 412 was masked with a non-porous, high density layer comprising a mixture of octodecane and icosane in approximately equal proportions. A layer of water was then applied to the surface and the heater bars 425 were heated by applying a voltage across each of them in 10,000 pulses each of 1 ns duration, with 1 µs between each pulse, in order to melt the masking layer in the vicinity of the heater bars.

The consequential localised phase change of the masking layer allowed the water to penetrate the masking layer and displace the masking material over the heater bars 425. The surface 412 was selectively unmasked in the vicinity of the heater bars 425. The water and displaced masking material was then removed and the surface washed and dried.

Potassium iodide was then applied to the surface for etching exposed areas of gold on the surface. The remainder of the masking layer was then removed from the surface 412.

As shown in FIG. 12B, the potassium iodide accurately etched away the gold of the heater bars 425 exposing the underlying chromium layer 414, but did not affect the other pieces of gold which remained masked.

In yet further variants of the methods described above, it will be appreciated that the masking layer may be applied uniformly to all of the sites and 20; 220 on the substrate 10; 10'; 210, without leaving any sites unmasked in the first instance. Thereafter, selected sites can be unmasked using the methods described above with a co-solvent optionally comprising a dispersion of nanoparticles of the masking material or with a polar fluid.

In accordance with the present invention as hereinbefore described therefore there are provided methods of masking or unmasking selected sites on a substrate to render some sites inaccessible to the reagents used for molecular assembly such, for example, as oligonucleotide or peptide synthesis, whilst leaving the other sites unmasked, so that molecular assembly can take place at those other sites. The methods of masking and unmasking in accordance with the present invention involve applying thermal energy at selected sites to a layer of masking material on the surface to bring about at least one phase change in the masking material such that masks or unmasks the selected sites.

For selective masking, the thermal energy applied to the selected sites is at least sufficient to bring about a phase change such that the masking material wets the surface of the substrate at the selected sites, so that the masking material can be removed from the non-selected sites without dislodging the masking material from the selected sites. Afterwards, if necessary, the masking material at the selected sites can be further treated to render it non-porous.

For selective unmasking, the thermal energy applied to the selected sites is sufficient to bring about a phase change such that the masking material can be displaced from the surface by a polar fluid, so that the masking material can be removed from the selected sites without dislodging the masking material from the non-selected sites.

The thermal energy applied at the selected sites is sufficient to cause the phase change in the masking material, but does not increase the temperature of the masking material at the sites, or does not significantly increase the temperature of the masking material at the sites, so that adjacent non-selected sites are not affected. In some embodiments, the spacing between sites may be about 4-5 µm, while in other embodiments, the spacing of the sites may be only 100-500 nm. The method of the invention in which the thermal energy applied at the sites to bring about the phase change of the masking material and thus create a predetermined pattern of the masking material on the surface without substantially increasing the temperature of the masking material allows a high resolution mask on the surface to be accurately created. In some embodiments the substrate may comprise up to 1,000,000 sites, while at the smallest spacing, the substrate may comprise more than 100 million sites—even 1 billion sites in some embodiments.

At the greater spacing between the sites on the substrate, a scanning laser may be used to apply the thermal energy to the selected sites, with metal or other targets provided on the substrate at the sites to receive the thermal energy and melt the masking material there. However, at the smaller resolution, the substrate may be formed on a silicon chip with a micro-heater at each site. This also advantageously allows integration of the substrate with data control. By conveniently transmitting data from the computer to the silicon chip substrate in the form of a sequence of shift register chains to a plurality of control logic elements, each of which controls a cluster of sites, data may be written to the chip with a data-write bandwidth of the order of 1 Tb per second. For synthesising an array comprising 1 billion oligonucleotide probes, a data-write bandwidth of this speed allows the data to be written to the chip within the order of milliseconds per cycle as described above. It will be appreciated that for such huge arrays, slower data-write speeds would represent a significant factor in production time and cost. For instance, to create an array of the order of 1 billion oligonucleotide probes using a scanning laser would take several hours per cycle.

In accordance with the present invention therefore the fabrication of a micro-array comprising a library of more than 100 million sites, and even several billion sites, becomes feasible within reasonable production times. Those skilled in the art will appreciate the benefit of a substrate comprising several billion DNA probes which would be sufficient to cover, for example, all of the inherited SNP genetic variations for the human population on a single chip.

In accordance with a tenth embodiment of the invention therefore there is provided a micro-array comprising a library of oligonucleotides, peptides, oligosaccharides or Click chemistry molecules on the substrate in accordance with the invention.

The invention claimed is:

1. A method for creating a mask on a surface of a substrate to mask selected functionalised sites on the surface, the surface including a plurality of sites, wherein the substrate includes a plurality of spaced heating elements at respective sites on the surface, the heating elements being disposed on or proximal to the surface, the plurality of sites being functionalised to possess a functional property that is absent from the surface between the sites;

the method comprising:
   applying, using a selectively operable dispenser, a layer of masking material onto the surface to cover the plurality of sites;
   selectively applying, using a heating controller, an energy through the heating elements at each site to melt and adhere the masking material to the surface at selected sites, whereby the applied energy brings about a phase change in the masking material at the selected sites, and forming a non-porous layer to mask the selected sites; and
   treating at least one non-selected site in the plurality of sites.

2. The method according to claim 1, wherein the functional property permits the site to react with at least one of the following: an extrinsic agent, a substance, a material, and any combination thereof.

3. The method according to claim 2, wherein each functionalised site is derivatised with a surface-bound molecular precursor.

4. The method according to claim 1, wherein said masking material includes a waxy non-polar organic substance having a melting point in the range of approximately 10° C. to approximately 75° C.

5. The method according to claim 1, wherein the heating element at each site comprises a micro-heater.

6. The method according to claim 1, wherein the application of energy to the selected sites is controlled by a computer.

7. The method according to claim 1, wherein the masking material is applied to the surface in a first removable phase and the applied energy brings about a phase change in the masking material at the selected sites such that it adheres to the surface for masking the selected sites.

8. The method according to claim 1, wherein said masking material is applied to the surface in a particulate form, and the applied energy causes the particles to melt and coalesce.

9. The method according to claim 1, wherein the applied energy brings about the phase change in the masking material at the selected sites without increasing a temperature of the masking material at the selected sites.

10. The method according to claim 1, further comprising:
   (a) providing a surface defining an array of sites, wherein each site includes a heating element;
   (b) depositing a layer of masking material in a first removable phase on the surface to cover the plurality of the sites;

(c) applying thermal energy to the masking material at one or more selected ones, but not all, of the plurality of sites to cause or allow the masking material to undergo a first localised phase change to a second phase at said selected sites; and (d) removing the remainder of the masking material in the first phase from the surface.

11. The method according to claim 3, wherein the treating includes treating the at least one non-selected site with at least one extrinsic reagent to produce at least one synthesized molecule.

12. The method according to claim 11, wherein the treating includes
reacting the surface-bound molecular precursor at at least one non-selected site with an extrinsic molecular chain extender to extend the surface-bound molecular precursor, wherein the surface-bound molecular precursor includes a reactive chemical moiety.

13. The method according to claim 12, wherein the surface-bound molecular precursor is a surface-bound oligonucleotide including a protected free terminal reactive group, and the molecular chain extender including a nucleosidic chain extender having a first unprotected reactive group capable of reacting with the protected free terminal reactive group of the surface-bound molecular precursor and a second protected reactive group;
the reacting including
de-protecting the surface-bound oligonucleotide; and
reacting the surface-bound oligonucleotide with the nucleosidic chain extender to extend the surface-bound oligonucleotide at at least one non-selected site.

14. The method according to claim 13, further comprising
removing the masking material from the surface after completion of the reacting of the surface-bound oligonucleotide with the nucleosidic chain extender;
re-masking the at least one selected site in the plurality of sites on the surface;
de-protecting the free terminal reactive group on the surface-bound oligonucleotide at at least one non-selected site; and
repeating the reacting of the surface-bound oligonucleotide with the nucleosidic chain extender using at least one of the nucleosidic chain extender and another nucleosidic chain extender
repeating the treating to obtain at least one synthetic oligonucleotide having a desired sequence.

* * * * *